United States Patent
Burton et al.

(10) Patent No.: US 11,289,086 B2
(45) Date of Patent: Mar. 29, 2022

(54) SELECTIVE RESPONSE RENDERING FOR VIRTUAL ASSISTANTS

(71) Applicant: MICROSOFT TECHNOLOGY LICENSING, LLC, Redmond, WA (US)

(72) Inventors: Nicholas David Burton, Bellevue, WA (US); Arash Ghanaie-Sichanie, Woodinville, WA (US); Qi Liu, Bellevue, WA (US); Senthil Kumar Velayutham, Sammamish, WA (US); Jian Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 16/724,096

(22) Filed: Dec. 20, 2019

(65) Prior Publication Data
US 2021/0134286 A1 May 6, 2021

Related U.S. Application Data

(60) Provisional application No. 62/929,731, filed on Nov. 1, 2019.

(51) Int. Cl.
*G10L 15/22* (2006.01)
*G06F 9/451* (2018.01)
(Continued)

(52) U.S. Cl.
CPC .............. *G10L 15/22* (2013.01); *G06F 3/012* (2013.01); *G06F 3/013* (2013.01); *G06F 3/167* (2013.01);
(Continued)

(58) Field of Classification Search
CPC ......... G10L 15/22; G10L 15/08; G10L 15/25; G10L 25/51; G10L 2015/088;
(Continued)

(56) References Cited

U.S. PATENT DOCUMENTS

| 6,219,645 B1 | 4/2001 | Byers |
| 6,226,749 B1 * | 5/2001 | Carloganu .............. G06F 21/31 726/2 |

(Continued)

OTHER PUBLICATIONS

"International Search Report and Written Opinion Issued in PCT Application No. PCT/US2020/055447", dated Jan. 29, 2021, 12 Pages.
(Continued)

*Primary Examiner* — Mohammad K Islam
(74) *Attorney, Agent, or Firm* — NovoTechIP International PLLC

(57) ABSTRACT

A system and method for selecting a target device out of a larger group of candidate devices for rendering a response from a virtual assistant to an end-user is disclosed. The system determines that a same trigger phrase included in an utterance has been received by multiple devices that are in proximity to one another at around the same time. These candidate devices can collect attention data, such as user gaze toward a device, to select the device that was most likely the intended recipient of the utterance. The system is configured to control the virtual assistant to render a response solely via the selected device.

22 Claims, 11 Drawing Sheets

(51) Int. Cl.
  *G06F 3/01* (2006.01)
  *G06F 3/16* (2006.01)
  *G10L 15/25* (2013.01)
  *G10L 25/51* (2013.01)
  *G10L 15/08* (2006.01)

(52) U.S. Cl.
  CPC .............. *G06F 9/453* (2018.02); *G10L 15/08* (2013.01); *G10L 15/25* (2013.01); *G10L 25/51* (2013.01); *G10L 2015/088* (2013.01); *G10L 2015/223* (2013.01)

(58) Field of Classification Search
  CPC ... G10L 2015/223; G06F 9/453; G06F 3/012; G06F 3/013; G06F 3/167
  See application file for complete search history.

(56) References Cited

U.S. PATENT DOCUMENTS

| | | | |
|---|---|---|---|
| 6,408,272 B1* | 6/2002 | White | G10L 15/30 704/270.1 |
| 6,836,760 B1* | 12/2004 | Bellegarda | G10L 15/1822 704/238 |
| 7,554,571 B1 | 6/2009 | Beck et al. | |
| 8,350,891 B2 | 1/2013 | Khot et al. | |
| 8,379,077 B2 | 2/2013 | Wu et al. | |
| 8,515,736 B1* | 8/2013 | Duta | H04M 3/5232 704/9 |
| 8,761,373 B1* | 6/2014 | Raghavan | H04M 3/4936 379/265.03 |
| 8,838,434 B1* | 9/2014 | Liu | G06F 40/58 704/2 |
| 8,983,840 B2* | 3/2015 | Deshmukh | G10L 25/48 704/257 |
| 9,088,694 B2 | 7/2015 | Navon et al. | |
| 9,131,369 B2* | 9/2015 | Ganong, III | G10L 15/30 |
| 9,148,627 B2 | 9/2015 | Anderson et al. | |
| 9,369,672 B2 | 6/2016 | Hiller et al. | |
| 9,405,832 B2* | 8/2016 | Edwards | G06F 16/951 |
| 9,467,657 B2 | 10/2016 | Decker et al. | |
| 9,484,021 B1* | 11/2016 | Mairesse | G10L 15/02 |
| 9,514,747 B1* | 12/2016 | Bisani | G10L 15/08 |
| 9,607,617 B2* | 3/2017 | Hebert | G10L 15/18 |
| 9,619,459 B2* | 4/2017 | Hebert | G06F 16/90332 |
| 9,966,065 B2* | 5/2018 | Gruber | G06F 40/205 |
| 10,018,977 B2* | 7/2018 | Cipollo | G05B 15/02 |
| 10,129,510 B2* | 11/2018 | Ma | H04N 9/3185 |
| 10,321,093 B2 | 6/2019 | Duckworth et al. | |
| 10,362,272 B1 | 7/2019 | Van Os et al. | |
| 10,388,277 B1* | 8/2019 | Ghosh | G10L 15/22 |
| 10,521,189 B1* | 12/2019 | Ryabov | G06F 40/289 |
| 10,768,693 B2* | 9/2020 | Powderly | G02B 27/017 |
| 2002/0105575 A1 | 8/2002 | Hinde et al. | |
| 2006/0025995 A1* | 2/2006 | Erhart | G10L 15/1822 704/239 |
| 2006/0149544 A1* | 7/2006 | Hakkani-Tur | G10L 15/22 704/236 |
| 2007/300165 A1 | 12/2007 | Haveliwala | |
| 2010/0268536 A1* | 10/2010 | Suendermann | G10L 15/1815 704/243 |
| 2010/0332234 A1* | 12/2010 | Agapi | G10L 15/22 704/275 |
| 2013/0151250 A1* | 6/2013 | VanBlon | G10L 15/30 704/235 |
| 2013/0159000 A1* | 6/2013 | Ju | G10L 15/1822 704/254 |
| 2013/0326353 A1* | 12/2013 | Singhal | G06F 3/167 715/728 |
| 2014/0039899 A1* | 2/2014 | Cross, Jr. | G10L 21/06 704/275 |
| 2014/0058732 A1* | 2/2014 | Labsky | G10L 15/30 704/254 |
| 2014/0207442 A1* | 7/2014 | Ganong, III | G10L 15/30 704/201 |
| 2015/0012271 A1* | 1/2015 | Peng | G10L 15/08 704/235 |
| 2015/0120288 A1* | 4/2015 | Thomson | G10L 15/22 704/231 |
| 2015/0120296 A1* | 4/2015 | Stern | G10L 15/30 704/236 |
| 2015/0279352 A1* | 10/2015 | Willett | G10L 19/0017 704/231 |
| 2015/0309316 A1* | 10/2015 | Osterhout | G06F 3/012 345/8 |
| 2015/0348548 A1* | 12/2015 | Piernot | G10L 15/26 704/235 |
| 2016/0011853 A1 | 1/2016 | Rogers et al. | |
| 2016/0012819 A1* | 1/2016 | Willett | G10L 15/14 704/233 |
| 2016/0155443 A1 | 6/2016 | Mooney et al. | |
| 2016/0379626 A1* | 12/2016 | Deisher | G10L 15/197 704/232 |
| 2017/0097618 A1* | 4/2017 | Cipollo | G10L 15/22 |
| 2017/0169818 A1* | 6/2017 | VanBlon | G10L 15/22 |
| 2017/0177716 A1* | 6/2017 | Perez | G06F 16/90332 |
| 2017/0213546 A1* | 7/2017 | Gilbert | G06F 40/30 |
| 2017/0236512 A1* | 8/2017 | Williams | H04R 3/12 381/79 |
| 2017/0278511 A1* | 9/2017 | Willett | G10L 25/84 |
| 2017/0278514 A1* | 9/2017 | Mathias | G10L 15/22 |
| 2017/0294184 A1* | 10/2017 | Bradley | G10L 15/04 |
| 2017/0359456 A1* | 12/2017 | Shrubsole | G06F 3/013 |
| 2018/0018959 A1* | 1/2018 | Des Jardins | G10L 15/32 |
| 2018/0060326 A1* | 3/2018 | Kuo | G06Q 50/01 |
| 2018/0061403 A1* | 3/2018 | Devaraj | G06F 3/167 |
| 2018/0061404 A1* | 3/2018 | Devaraj | G10L 15/22 |
| 2018/0197545 A1* | 7/2018 | Willett | G10L 15/005 |
| 2018/0211663 A1* | 7/2018 | Shin | G10L 15/1815 |
| 2018/0211668 A1* | 7/2018 | Willett | G10L 15/30 |
| 2018/0233141 A1* | 8/2018 | Solomon | G06K 9/00 |
| 2018/0247065 A1* | 8/2018 | Rhee | G06F 3/167 |
| 2018/0268818 A1* | 9/2018 | Schoenmackers | G10L 15/26 |
| 2018/0314689 A1* | 11/2018 | Wang | G10L 15/07 |
| 2018/0330728 A1* | 11/2018 | Gruenstein | G10L 15/26 |
| 2019/0027147 A1* | 1/2019 | Diamant | G06F 16/3329 |
| 2019/0043509 A1* | 2/2019 | Suppappola | G10L 17/00 |
| 2019/0043529 A1* | 2/2019 | Muchlinski | G10L 25/84 |
| 2019/0057693 A1* | 2/2019 | Fry | G10L 15/1815 |
| 2019/0066670 A1 | 2/2019 | White et al. | |
| 2019/0103101 A1* | 4/2019 | Danila | G10L 15/22 |
| 2019/0138268 A1* | 5/2019 | Andersen | G06F 3/167 |
| 2019/0139541 A1* | 5/2019 | Andersen | G10L 15/16 |
| 2019/0295552 A1* | 9/2019 | Pasko | G06F 3/167 |
| 2019/0362557 A1* | 11/2019 | Lacey | G06F 3/012 |
| 2019/0371307 A1* | 12/2019 | Zhao | G06F 40/174 |
| 2020/0142667 A1* | 5/2020 | Querze | H04S 7/304 |
| 2020/0202856 A1* | 6/2020 | Ivanov Bonev | G10L 15/08 |
| 2020/0409469 A1* | 12/2020 | Kannan | G06Q 30/0641 |

OTHER PUBLICATIONS

"Changing Your Own Video Layout", Retrieved from: https://documentation.avaya.com/bundle/UsingXTSeries_r91/page/xt1000_ug_calls_changeVideoLayout.html, Retrieved Date: Apr. 21, 2020, 3 Pages.

"Using Dual Monitors with the Zoom Desktop Client", Retrieved from: https://support.zoom.us/hc/en-us/articles/201362583-Using-Dual-Monitors-with-the-Zoom-Desktop-Client?mobile_site=true, Retrieved Date: Apr. 21, 2020, 3 Pages.

"ViewSplit-Display Layout Software", Retrieved from: https://web.archive.org/web/20170318042724/https:/www.viewsonic.com/us/viewsplit.html, Mar. 18, 2017, 4 Pages.

* cited by examiner

SELECTIVE RESPONSE RENDERING FOR VIRTUAL ASSISTANTS

CROSS-REFERENCE TO RELATED APPLICATION

This application claims the benefit of priority from U.S. Provisional Patent Application Ser. No. 62/929,731, filed on Nov. 1, 2019, and entitled "Response Rendering for Virtual Assistants," which is incorporated by reference herein in its entirety.

BACKGROUND

Progress in machine learning, language understanding, and artificial intelligence are changing the way users interact with computers. Virtual assistants, such as Siri™ Google Now™, Amazon Echo™, and Cortana™, are examples of a shift in human computer interaction. A user may rely on a virtual assistant to facilitate carrying out certain computer-implemented tasks. In operation, the user may directly issue a spoken command to the virtual assistant, such as by uttering, "Assistant, set up an appointment with John Smith on Tuesday at 10 o'clock AM." The virtual assistant applies natural language processing to interpret the user's spoken command, and then carries out the user's command.

While virtual assistant technology now offers satisfactory availability, accuracy, and convenience, interacting with a virtual assistant represents an artificial human-machine exchange that departs from the typical manner in which users interact with their environments. A user often wants or needs to multi-task so that various tasks can be performed while working in a space in which he or she is surrounded by multiple virtual assistant-enabled devices. However, attempting to direct a request for the services of a virtual assistant from a particular device in such environments can often lead to confusing interactions whereby more than one—or a secondary device—attempts to provide a response to the user. New and improved approaches for improving such interactions between users and virtual assistants are desirable.

SUMMARY

A system for selecting a computing device to provide access to a virtual assistant, in accordance with a first aspect of this disclosure, includes one or more processors and one or more machine-readable media including instructions stored therein which, when executed by the one or more processors, cause the system to determine a first spoken utterance captured as a first audio signal by a first device around a first time includes a first trigger phrase for engaging with a virtual assistant, and receive, from the first device, a first attention signal captured by the first device around the first time. The instructions further cause the system to determine, based on the first attention signal, that the first device was the most likely intended recipient device of the first trigger phrase, and render a response to the first spoken utterance via the first device in response to the determination that the first device was the most likely intended recipient device.

A method of selecting a computing device to provide access to a virtual assistant, in accordance with a second aspect of this disclosure, includes determining a first spoken utterance captured as a first audio signal by a first device around a first time includes a first trigger phrase for engaging with a virtual assistant, and receiving, from the first device, a first attention signal captured by the first device around the first time. The method also includes determining, based on the first attention signal, that the first device was the most likely intended recipient device of the first trigger phrase, and rendering a response to the first spoken utterance via the first device in response to the determination that the first device was the most likely intended recipient device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
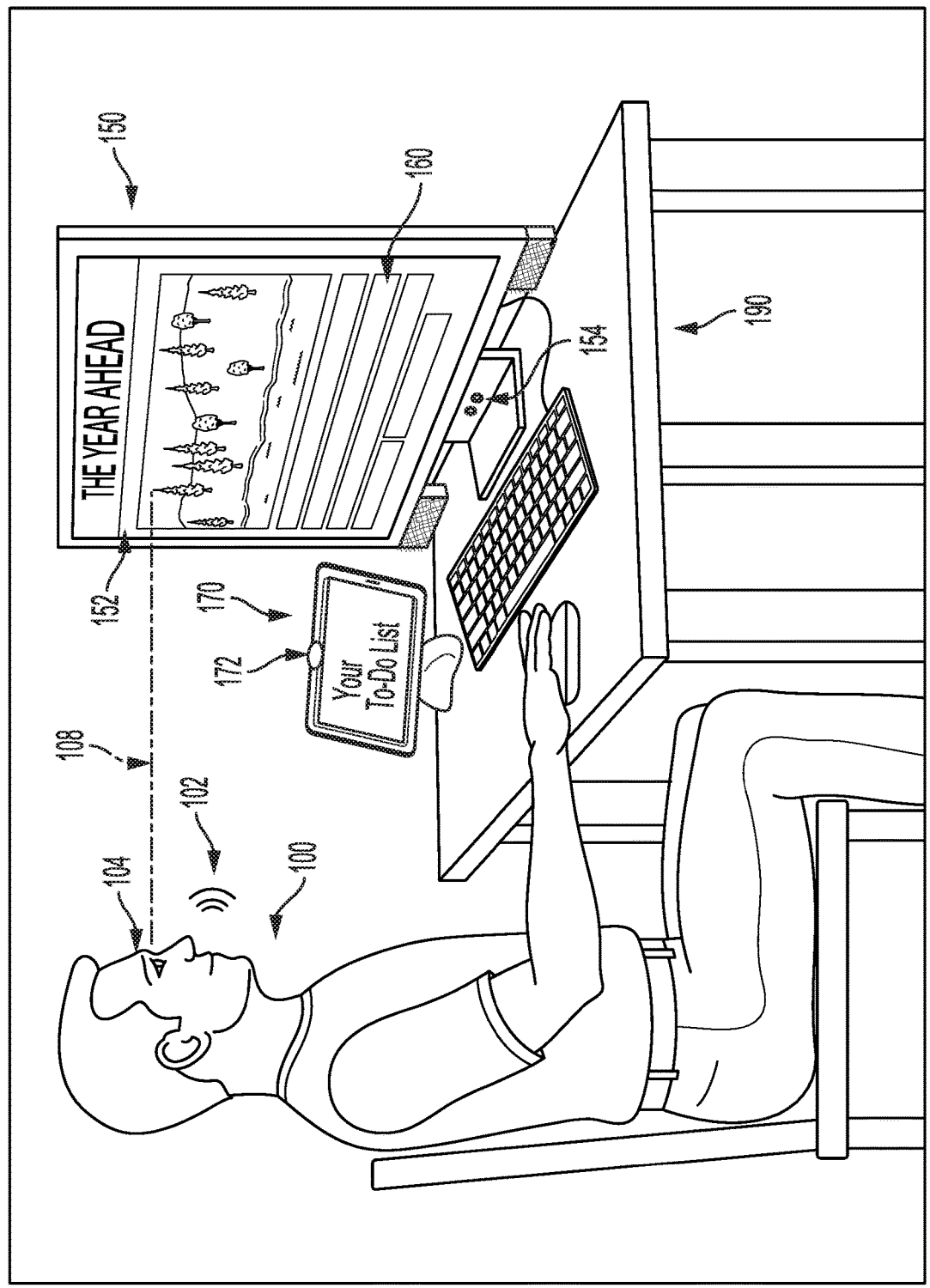
FIGS. 1A and 1B illustrate examples of a user interacting with a virtual assistant following a device selection process based on the user's attention.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

The following implementations introduce methods and systems for receiving a user's spoken utterance as input requesting the services of a virtual assistant that is available at multiple device endpoints and selectively providing a response via the device to which the user was most likely directing the spoken utterance. Currently, a user may be able to access a host agent, virtual agent, or virtual assistant (VA) by initially speaking a specific word or phrase, which may be referred to as a "wake phrase," "trigger phrase," or "wake word" (even for a phrase with multiple words, such as "Hey Cortana"), to a device configured with the VA service (which may be referred to as a "VA-enabled device"). The virtual assistant applies natural language processing to recognize and/or interpret a user's spoken utterance, and then responds to the user's spoken utterance (for example, by carrying out a command in the spoken utterance).

However, with a conventional system, there can be cases where the user issues a spoken utterance for the VA service in an environment with multiple VA-enable devices, for different individuals, that are each in sufficient proximity to the user to receive and process the spoken utterance via the VA service, As a result, more than one of the devices may 'wake' and attempt to render a response to the spoken utterance, and/or one or more of the devices that were not intended to render a response to the spoken utterance nevertheless attempt to render a response to the spoken utterance. This can cause confusion and frustration for the user. For example, in a shared workspace with multiple VA-enabled device for different people, the user may find their colleague's device attempting to render a response to a spoken utterance that the user intended to be directed to their own device.

In order to address these issues, and improve the experience of end-users with a virtual assistant in environments with multiple VA-enabled devices, the proposed systems and methods make use of a VA manager that is configured to intelligently select a single device for rendering a response to a spoken utterance based on additional input signals received by the devices. By application of the technologies described herein, although there may be circumstances in which more than one device receives a spoken utterance, only one of those devices will render a response to the spoken utterance. From the user's perspective, the appropriate device responds predictably and reliably, without overlapping responses from other nearby devices.

Figure 1B:
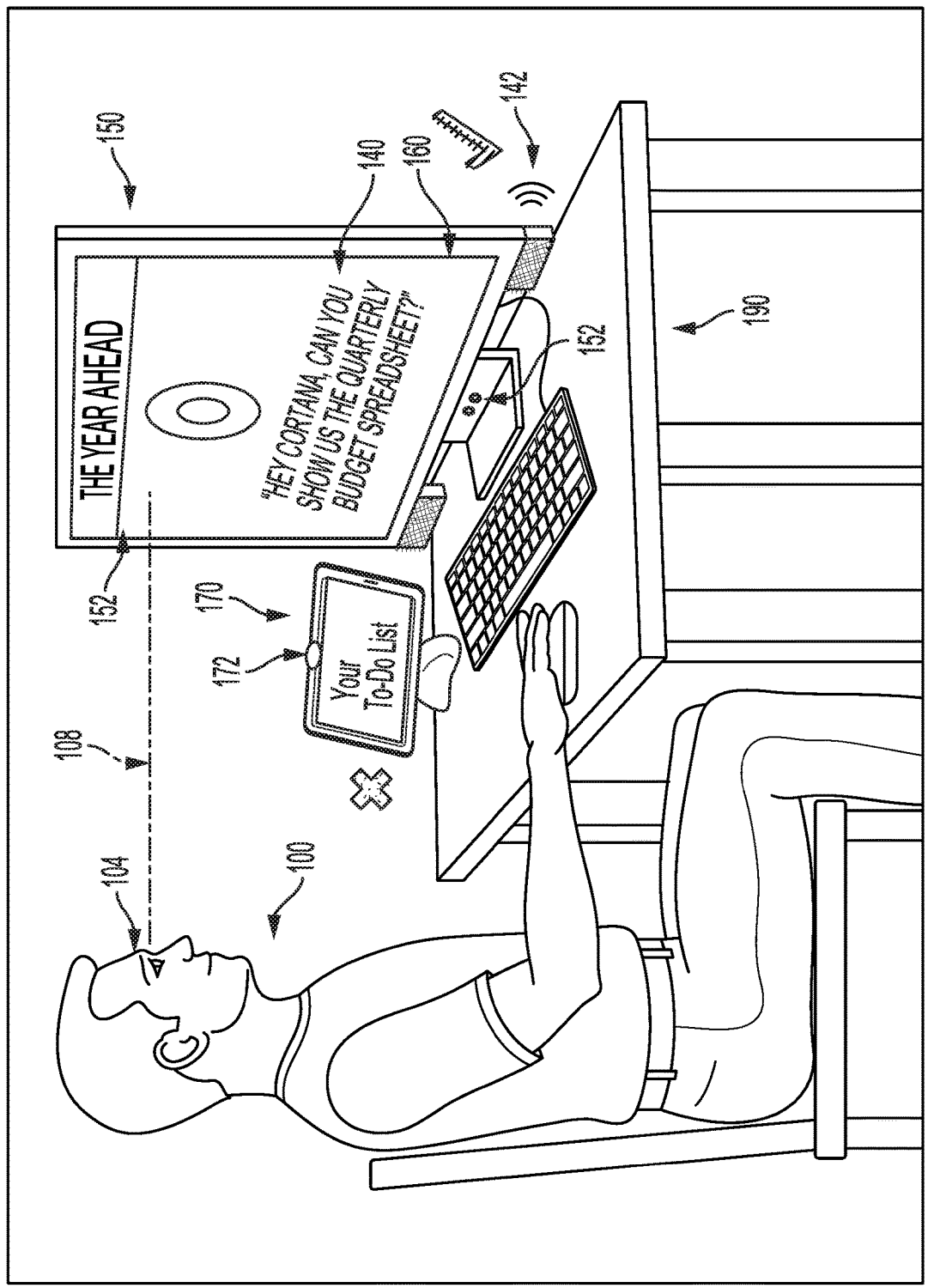

In order to better introduce the systems and methods to the reader, FIGS. 1A and 1B presents a high-level example of a representative environment ("environment") 190 for implementing a selective virtual assistant response management system. In different implementations, the environment 190 can include one or more computing device end-users, or simply "users". One or more users can interact with or manipulate data presented via a user device. The various features and activities illustrated in FIGS. 1A and 1B are described generally, with further details and examples presented in connection with later figures.

As an example, a first user 100 is shown in FIGS. 1A and 1B. In this case, the first user 100 is a user of both a first client computing system ("first client") 150 and a second client computing system ("second client") 170. The first client 150 shown here is a desktop computer, and the second client is a tablet device. However, in other implementations, the device may be a personal computer such as a laptop computer, a tablet, a mobile device, or any other computer system. The first client 150 and/or second client 170 can execute an operating system such as Microsoft Windows®, Apple macOS®, Apple iOS®, Apple iPadOS®, Android, Unix®, or other operating system, and include memory, storage, a network interface, and other computer hardware not shown in FIG. 1A. The first client 150 and/or second client 190 can each be VA-enabled devices configured to render responses to spoken utterances issued by a user for a VA service. In FIGS. 1A and 1B, only two devices are shown, but any number of VA-enabled devices and systems may be present or in 'listening range' of a user where they can receive spoken utterances issued by the user. In addition, in some implementations, the first client 150 and/or second client 170 can be connected via one or more networks to a server, or an online or cloud-based computing service ("cloud service"). In some examples, as the first user 100 accesses or interacts with electronic content via the first client 150, various content or metadata associated with the content may be updated, transmitted, received, or saved to/from/by the cloud storage through via the one or more networks.

In FIG. 1A, the first user 100 is viewing a document 160 on a display 152 of the first client 150. Thus, the attention of first user 100, as represented by a dotted line 108 extending between eyes 104 of the first user 100 and an approximate focal point of the first user 100 on the display 152, may be understood to be directed toward first client 150 during a first time. Information reflecting this attention to the first client 150, such as, but not limited to, images captured by first cameras 154 of the first client 150 and/or second cameras 172 of the second client 170, can be used by the selective virtual assistant response management system to select a client, as will be discussed below.

In different implementations, a user may rely on or otherwise initiate a conversation session with a VA. In some implementations, the first user 100 can issue a spoken utterance 102, corresponding to a request, instruction, or command issued by first user 100 to the VA, to initiate a conversation session. For example, "wake-on-voice" functionality may be implemented, in which case a user can initiate a conversation session with a VA service or VA-enabled device in connected standby (or otherwise low-resource mode) simply by uttering a wake phrase, and the device and/or VA service goes into a listening state for full speech recognition of spoken utterances during the conversation session. However, as previously noted, a problem can arise with conventional systems when there are multiple VA-enabled devices nearby when the wake phrase is uttered. There may be occasions where multiple nearby VA-enabled devices will wake-up (often with uneven synchronization), causing a startling or confusing experience for the user.

However, with the implementation of the proposed system, while a wake phrase may be received at a microphone of several VA-enabled devices configured to provide the VA service, only one of those devices will be selected to respond. In FIG. 1A, once a wake phrase has been recognized by both first client 150 and second client 170, for example by their main listening subsystems or an auxiliary listening subsystem, a selective virtual assistant response management system ("system") can determine that multiple endpoints (candidate devices) have received the same user input. In response, the system can select the candidate device that was most likely the target of the user's spoken utterance, as will be discussed in greater detail below. For example, the system may receive and evaluate additional information from each device regarding the apparent attention of the first user 100. In this case, as shown in FIG. 1B, the system determines that eye-gaze data of the first client 150 reflects a stronger attention relationship with the first user 100 than eye-gaze data collected by the second client 170. Based on this determination, the system issues a control command to the devices, whereby the selected first client 150 presents a response, here comprising both a visual presentation 140 and rendered speech 142 confirming the spoken utterance has been processed via the first client 150. Furthermore, while the VA service of selected first client 150 has been activated, the VA service of second client 170 remains dormant or unresponsive.

As a general matter, a virtual assistant may also be referred to as a virtual assistant system, a digital assistant, a digital assistant system, a digital personal assistant, and/or an automated agent. As a general matter, such terms should be understood to encompass a processing environment that is adapted to utilize spoken cues from spoken utterances to effect human-computer interactions. Thus, some or all of the processing environment may be referred to as, included in, and/or include the virtual assistant. For example, in some implementations, this processing environment includes a virtual assistant including an interpretation module, an action-taking module, a response generation module, a knowledge access module, a virtual assistant information store, and a user information store. In such implementations, the virtual assistant may include program interfaces allowing other modules of processing environment to interact with, control, and receive information from the virtual assistant.

In addition, for purposes of this disclosure, "activation" will be used to describe when a device receives a user signal to come out of standby and be ready for use. Generally, voice activation ("using your voice to wake-up a device") can be used, but other natural-user-interface-based activation can be used. Similarly, the term "wake up" is used to describe when an always-listening VA-enabled device goes from a less resource intensive "only listening for specific wake up word" mode to full-listening mode. Furthermore, the term "nearby" can describe a device that is physically close to the user. Devices that are near enough to 'hear' or discern a user's spoken utterance can be considered as nearby. In addition, a "target device" refers to the specific device that the user intended to use with the VA service as evidenced by criteria collected by the devices. In most situations, there is a specific device the user intended to use.

Figure 2:
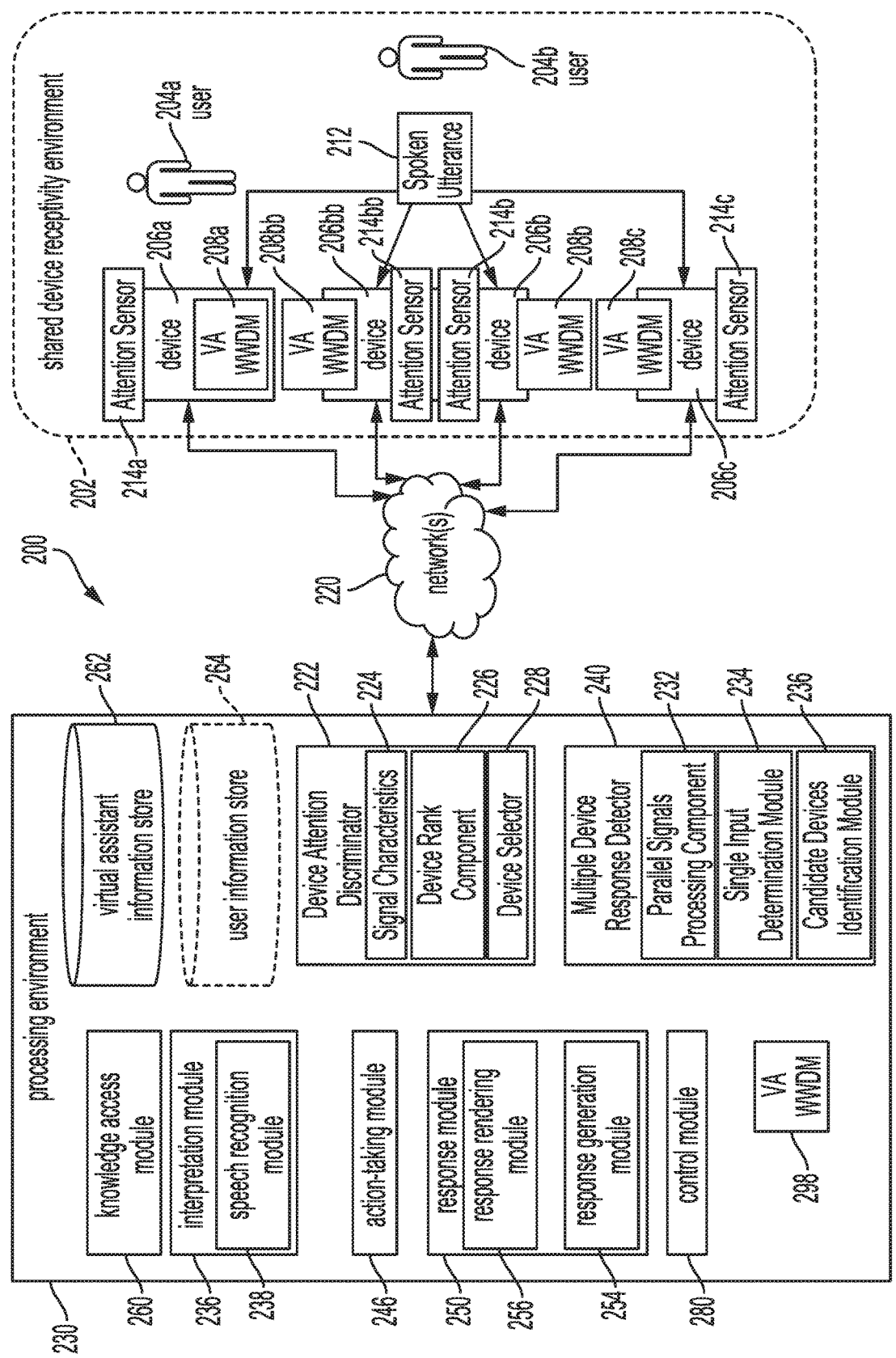
FIG. 2 illustrates a schematic example of a system including a processing environment configured to select a device to render a response to a spoken utterance directed to a virtual assistant.

FIG. 2 illustrates a schematic example of a system 200 including a processing environment 230 configured to provide the services of a virtual assistant in a shared device receptivity environment ("device environment") 202. The device environment 202 refers to an environment in which one or more users are able to interact with a virtual assistant in real-time via spoken conversation. In the discussion directly presented herein, a virtual assistant service session may simply be referred to as a "session."

In the example illustrated in FIG. 2, there are two users (204a and 204b) who are located near a plurality of VA-enabled devices 206 (also referred to herein as device endpoints) in a shared device receptivity environment 202. Such an environment 202 may also referred to herein as a shared receptivity device neighborhood ("device neighborhood") to underscore the close physical proximity of the devices to one another. The identification of a device neighborhood will be discussed further below with reference to FIG. 3.

In FIG. 2, a first user 204a is at a workstation with a first device 106a, and a second user 204b is at a nearby workstation that includes both a second device 106b and a third device 106bb. Furthermore, at a third workstation disposed near to both the first workstation and the second workstation is a fourth device 106c at which no user is currently present. Each of the three workstations is proximate to, or within speaking distance of, the other two workstations. In addition, each device is configured to provide access to a VA service.

Although only two users and four devices are illustrated in FIG. 2, it is understood that system 200 may be adapted to interact with practically any number of concurrent sessions, devices, and users. Each device may be configured to allow use of one or more telecommunications services, and/or to execute software instructions configured to allow the user device to interact with processing environment 230, including, for example, providing utterance information to processing environment 230, receiving responses from processing environment 230, and/or presenting the received responses to one or more users. In some examples, a user device may be a user computing device suitable for executing software instructions, which may be included in one or more software applications, configured to allow the user device to interact with processing environment 230. Examples of user computing devices include, but are not limited to, a smartphone, a tablet computer, a smart watch, a wearable computer, a personal computer, a desktop computer, a gaming system, a laptop computer, a virtual reality (VR) device, and augmented reality (AR) device, and a mixed reality (MR) device. Such a VR/AR/MR device (with the phrase "VR/AR/MR" referring to the use of one or more of VR, AR, and/or MR) may include a head mounted display (HMD) that provides an immersive virtual experience for a user wearing and viewing the HMD, such as, but not limited to, the Microsoft HoloLens™ or Oculus Rift™. This list is only an example, and should not be considered as limiting. In some examples, some of the users may be absent while their workstation devices remain present in the shared space. In other implementations, there may be only one user who is associated with all four devices.

The devices 206 may also be configured to communicate with one another and/or with processing environment 230 over a network 220. Network(s) 220 includes one or more data communication networks allowing data to be communicated between various elements of the system 200, such as devices 206a, 206b, and 206c, external information store 222, external services 224, and/or the modules and elements included in processing environment 230. Network(s) 220 may include, for example, the Internet, an internet service provider (ISP) connection, a local wired or wireless network (such as, but not limited to, Wi-Fi or Ethernet), a short range wireless network (such as, but not limited to, Bluetooth), and/or an internal network connecting two or more of the modules and elements included in processing environment 230.

Thus, the devices can be connected to the Internet and communicate over the Internet. However, it may be appreciated that the proposed systems can work without an Internet connection. For example, communication can take place over a local network, private network, ad-hoc network, or the like. A device can broadcast messages to other devices on the same network. An ad-hoc (which may be private) wireless network can be used to communicate even if there is no formal network in place. Devices can determine whether they are within a certain proximity of each other, and such technology can also be used to interconnect the devices.

In some implementations, the device endpoints can be limited to those that are registered with a service provider or service provider group. If so, the interconnected devices can be limited to those that are registered to a same account (for example, an account associated with a particular username).

Devices that are not so registered can be excluded from responding. In this way, one user's devices can broadcast messages, but those devices registered to a different user will not respond. For example, devices can communicate directly with a server over TCP/IP, HTTP, or the like. Windows Push Notification Services or similar services can be used to communicate between devices, wake devices, or the like.

A Wi-Fi Direct service (WiFiDS) can be used so that devices can communicate even if they are not on the same network, there is no network (e.g., in a public space), or the like. Simple Search and Discover Protocol (SSDP) can be used to detect devices on the same access point (e.g., same subnet). For example, such an approach can be used if a device does not meet the hardware, driver, and/or software prerequisites for WiFiDS. Near Field Communication (NFC) is typically employed through radio communication and can also be used. It is expected that other and future-developed technologies can be used to accomplish communication between and among the devices as described herein.

Each device endpoint also includes a local wake word/phrase detection module (modules 208a, 208b, 208bb, and 208c, each labeled "VA WWDM" in FIG. 2), although in some implementations, such wake phrase detection can be configured to occur remotely via a cloud service (for example, via a wake word/phrase detection module 298, labeled "VA WWDM" in FIG. 2). In addition, each of devices 206 include attention sensor(s) (sensors 214a, 214b, 214bb, 214c). The attention sensor(s) comprise one or more input devices that may collect data around and/or associated with the device. Such sensors can include but are not limited to microphones, IR cameras, RGB and other cameras, Bluetooth proximity sensors, etc. The attention sensors can be configured to collect information pertinent to assessing whether there is a user who is paying attention to the device, and how likely it is that such attention corresponds to an intention toward that device to respond to a spoken utterance directed to the VA. In practice, the systems shown herein can be more complicated, with additional functionality, more inputs, outputs, and the like. Similarly, additional functionality related to location (e.g., GPS, indoor positioning technology, or the like) can be included to determine a current location of each device that hears a spoken utterance.

In the example of FIG. 2, each of the devices 206 include a microphone, a speaker, and a plurality of other hardware sensors. The microphone can be an internal or integral part of the device or can be an external source (e.g., USB microphone or the like). In some examples, the systems described herein can conserve power by implementing a reduced resource intensive state that is sometimes called "connected standby" herein. However, in practice, the state may be called something other than "connected standby." When a device is in a connected standby state, the hardware can accomplish recognition of the wake phrase with reduced resources (for example, reduced power and/or computation) because the wake phrase is known in advance, allowing use of a specialized process for detecting the wake phrase that does not require full speech recognition (and its associated resource demands) to yet be activated. A limited number of wake phrases beyond a single wake phrase can be supported in such instances. Each of the devices 206 can also include a stored device listening state that transitions from a low-power standby state to a pre-active state upon recognition of a wake phrase received by the microphone.

Furthermore, in different implementations, the system can include an auxiliary voice recognition subsystem (e.g., with auxiliary processor or other circuitry) that can be employed to achieve initial voice recognition of the wake phrase. So-called "full" recognition of one or more spoken utterances can be performed by a main voice recognition subsystem after the device wakes. The main voice recognition subsystem can be placed in inactive, standby, or sleep mode with respect to a particular device when the device is in the described connected standby state. Therefore, less resources are consumed by and/or for the device when in the standby state, but it is remains able to recognize the wake phrase. In this way, an always-listening experience can be provided across multiple VA-enable devices even if all the devices are not always actively listening for spoken utterances directed to the VA service. A system that implements such a lower power or connected standby listening state is sometimes called an "always-listening" device or a device with "always-listening" capability. In practice, the device need not be always listening. For example, a user can manually turn off the listening capability, or listening can be disabled or stopped for other reasons. After transitioning out of the standby state, the device can be in a non-standby (e.g., active, actively listening, or the like) state. Waking the device can thus activate the main processor from an inactive state.

It should be understood that the proposed system can be applied to scenarios where one or more VA-enabled devices are not in a connected standby state. For example, a user can be actively using or engaged with a device when uttering the wake phrase, while other nearby devices are in connected standby. Because the wake phrase triggers the device selection process, it may also be referred to as a "trigger phrase" or "keyword phrase." Upon detection of the wake phrase, the system is configured to control which one device out of the group of device endpoints will transition to a fully active listening state.

In some other implementations, one or more VA-enabled devices can also offer an additional user-specific voice recognition feature that may be used in conjunction with the wake word, whereby the system can be configured to only respond when the wake phrase is spoken by an authorized user (e.g., a user who is authorized on the listening device). Thus, user identification can be performed on the wake phrase (for example, based on phonetically rich data collected and processed during an enrollment phase, during daily use, or the like). In practice, additional layers of authentication for some actions or tasks can be required, but it can be useful to have user-specific recognition, especially when there are groups of devices being used by groups of people in the same location. In addition, in some implementations, additional user identification features can be used in combination with the wake phrase (e.g., a visual sensor can perform face recognition, skeletal recognition, or the like).

For the purposes of the example represented by system 200, only one of the users need to actually speak for the processing environment 230 to initiate a virtual assistant device selection process by the processing environment 230. In this case, only the second user 204b issues a spoken utterance 212, which may include a wake phrase, that is received by the respective microphones of each of the devices near the second user 204b, including a second device 206b and a third device 206bb. Furthermore, because the second user 204b is at a workstation that is also close to (i.e., within speaking distance of) a first device 206a and a fourth device 206c, the same spoken utterance 212 is also received via a microphone of the first device 206a and a microphone of the fourth device 206c. Although the figures illustrate the use of a wake phrase to initiate a request for VA services, it should be understood that in different implementations, a user may use other means of invocation not limited to voice.

In cases in which there is instead only one VA-enabled device available and the spoken utterance 212 includes the designated wake phrase, the VA associated with that device may be configured to respond immediately to the speaking user. However, in other cases where there are multiple VA-enabled devices 206 near to one another and the speaking user, as shown in FIG. 2, the system 200 may be configured to detect that multiple instances of the same input to these devices has occurred. In some implementations, the processing environment 230 may determine that more than one device of a device neighborhood has received the same input via a multiple device response detector 240. In different implementations, a parallel signals processing component 232 of the multiple device response detector 240 can receive and process data from devices 206 that indicates that two or more devices in a device neighborhood have received a similar spoken utterance at or around the same time. This data can be evaluated by a single input determination module 234 that can determine whether the spoken utterance received by each of the devices is substantially similar to warrant a determination that the devices have received the same input. In response to this determination, a candidate devices identification module 236 will identify the specific devices that have been potentially triggered by the same spoken utterance.

The candidate device information will be shared with a device attention discriminator 222 which can request additional data from the devices 206 regarding the relationship between the speaker (here, second user 204b) and the device that registered or otherwise detected the spoken utterance 212. For purposes of this example, all four of devices 206 have detected the spoken utterance 212, and so each of first device 206a, second device 206b, third device 206bb, and fourth device 206c have been identified as candidate devices whose VA service may be selected to respond to and engage with the speaking user. In some implementations, a signal characteristics component 224 may receive and analyze attention data collected by each of the candidate devices at or around the time the spoken utterance 212 occurred, for example via attention sensors 214a, 214b, 214bb, 214c. This information can be used to assign a likelihood of that a particular candidate device was the target device (the device to which the user intended to direct their spoken utterance and/or the device that was intended to respond to the spoken utterance) and generate a ranking via a device ranking component 226 that may be used by a device selector 228 to select the device that was most likely to represent the target device. The most likely target device is then selected by a device selector 228 as the device that will render a response to the spoken utterance for a VA interaction. In this case, the system 200 has selected the second device 206b as most likely representing the user's target device. Thus, subsequent activities of the VA during this session will be provided by the selected second device 206b (also referred to now as the selected device). If there remains ambiguity between candidate devices, the system 200 can choose a most recently used or a most frequently used candidate device. Further details regarding the device selection process will be discussed with reference to FIG. 4 below.

In response to the device selection, the processing environment 230 is adapted to utilize spoken cues from utterances spoken by the second user 204b to influence a render state for a virtual assistant (not individually identified in FIG. 2). A virtual assistant may also be referred to as a virtual assistant system, a digital assistant, a digital assistant system, a digital personal assistant, and/or an automated agent. Some or all of the processing environment 230 may be referred to as, included in, and/or include the virtual assistant. For example, in some implementations, processing environment 230 includes a virtual assistant including an interpretation module 236, an action-taking module 246, a response module 250, and a knowledge access module 260. In some implementations, the virtual assistant may include program interfaces allowing other modules of processing environment 230 to interact with, control, and receive information from the virtual assistant.

Various examples of techniques and systems involving virtual assistants, interpretation of spoken utterances, and responding to such utterances are described in U.S. Patent Application Publication Numbers US 2017/0140041 (titled "Computer Speech Recognition And Semantic Understanding From Activity Patterns" and published on May 18, 2017), US 2017/0124447 (titled "Identifying Relevant Content Items using a Deep-Structured Neural Network" and published on May 4, 2017), US 2017/0092264 (titled "Detecting Actionable Items in a Conversation among Users" and published on Mar. 30, 2017), US 2017/0060848 (titled "Distributed Server System for Language Understanding" and published on Mar. 2, 2017), US 2017/0018271 (titled "Delayed Binding in Response Selection During Input Understanding Processing" and published on Jan. 19, 2017), US 2016/0373571 (titled "Use of a Digital Assistant in Communications" and published on Dec. 22, 2016), US 2016/0335138 (titled "Digital Assistant Extensibility to Third Party Applications" and published on Nov. 17, 2016), US 2016/0307567 (titled "Context Carryover in Language Understanding Systems or Methods" and published on Oct. 20, 2016), US 2016/0210363 (titled "Contextual Search Using Natural Language" and published on Jul. 21, 2016), US 2016/0203331 (titled "Protecting Private Information in Input Understanding System" and published on Jul. 14, 2016), US 2016/0196499 (titled "Managing User Interaction for Input Understanding Determinations" and published on Jul. 7, 2016), and US 2016/0171980 (titled "Digital Assistant Voice Input Integration" and published on Jun. 16, 2016), each of which are incorporated by reference herein in their entireties.

Processing environment 230 may correspond to one or more server computing devices, optionally together with other digital processing equipment (for example, routers, load-balancers, etc.). The computing devices associated with the processing environment 230 may be provided at a single location, or may be distributed over plural locations. Although in FIG. 2 various modules and other elements are illustrated as being included in the processing environment 230, it is noted that each of those elements and modules may be included, in whole or in part, in other portions of the system 200. In some implementations, processing environment 230 may be implemented by one or more of the devices 206a, 206b, 206bb, and/or 206c, allowing interaction with a virtual assistant provided by the device(s) without requiring data communication with remote computer systems. Processing environment 230 further includes a control module 280 which is configured to control and/or coordinate operation of the various modules included in the processing environment 230.

Although not illustrated in FIG. 2, in some implementations, processing environment 230 can include a user identification module that is configured to identify the user requesting the services of the VA based on, for example, voice recognition and/or facial recognition. In some implementations, some or all of the users may each be associated with a respective persistent unique identifier such as, but not limited to, a username or a user ID, that is used across multiple device sessions. In some examples, the user identification module may provide additional information such as, but not limited to, devices associated with each user (which may include devices other than those used to send and/or receive spoken conversation), devices associated with the session, information about such devices (which may be used, for example, to identify communication modalities available for a device), information about software applications being used and/or available on such devices, names of the users, names of teams, groups, companies, and/or organizations associated with the users, and/ or contact information for users (such as, but not limited to, messaging and/or email addresses). In some examples, some of the additional information may be stored in a user information store that is accessed via knowledge access module 260. Such additional information may be used by other modules included in processing environment 230.

Interpretation module 236 is configured to receive and process utterance information, such as utterance information for spoken utterance 212 and subsequent spoken utterances (for example, including commands or requests) presented by the speaker. Furthermore, interpretation module 236 is configured to generate interpretation results for the received utterance information, where the interpretation results reflect underlying meanings associated with the received utterance information. Interpretation results generated by interpretation module 236 for utterance information may include, for example, one or more contexts, one or more intents, and/or one or more contents.

Examples of contexts include, but are not limited to, whether the session is work related or personal and/or includes users not included in a business or organization. Such contexts may be created and/or maintained based on, for example, current utterance information or previous utterance information. By use of such context information, interpretation module 236 may more effectively identify and/or infer interpretation results, including, for example, an intent and/or content, for an utterance. Furthermore, intents (which may be referred to as "intent items") for a command or query included in an utterance are based on at least the recognized speech information provided by a speech recognition module 238 for the utterance. Such intents may be associated with, for example, verb phrases indicating an action to perform (for example, "send an email," or "make a reservation"), and verb phrases indicating a communication modality (for example, "tell" may be associated with voice, and "show" may be associated with visual presentation). In addition, contents (which may be referred to as "content items") for a command or query included in an utterance are based on at least the recognized speech information provided by the speech recognition module 238 for the utterance. Such contents may be associated with, for example, noun phrases.

Interpretation module 236 may also be configured to generate interpretation results based on the received utterance information and/or information retrieved by knowledge access module 260. In some implementations, the interpretation results are generated using at least one machine-trained model (such as, but not limited to, a model for a deep-structured neural network). The received utterance information may be provided as, for example, an audio signal containing the at least one utterance, recognized speech information, and/or detected utterances.

The speech recognition module 238 is adapted to receive utterance information that expresses at least one utterance presented by the speaker, and convert the utterance information to recognized speech information, and to provide one or more detected utterances. The received utterance information may be provided as, for example, an audio signal providing a digital representation of sound waves captured by one or more microphones associated with the selected device. The speech recognition module 238 may then use at least one machine-trained model (such as, but not limited to, a model for a deep-structured neural network) to convert the utterance information into recognized speech information. The recognized speech information includes one or more detected utterances by one or more users to the conversation. As mentioned previously, speech recognition may be implemented in part by the devices 206. For example, the selected device may be configured to capture an audio signal for an utterance, and perform an initial conversion of the audio signal into intermediate utterance information providing a more compact encoding of the utterance information. The system 200 may be configured to capture an utterance presented by a user at a time that the user is considered to be in a muted state (during which utterances by the user are not presented to other users), and use processing environment 230 to process the utterance, and providing a response via the virtual assistant associated with the selected device.

For some commands or queries, the processing environment 230 may perform, via action-taking module 246, one or more associated computer-implemented actions in addition to providing a response. Any such actions for a command or query in an utterance may be identified by the action-taking module 246 based on at least the interpretation results provided by the interpretation module 236 for the utterance. In some cases, action-taking module 246 may perform an action by accessing one or more external services, such as an electronic calendar, a directory, or other services, might be retrieved from a smartphone device associated with a requester. In some examples, action-taking module 246 performs an action to obtain information for a response and/or perform a command indicated by an utterance. In some cases, the action-taking module 246 automatically performs an action as soon as the action is identified and following the device selection process, or some time thereafter.

Response module 250 is configured to generate responses to the queries associated with the utterances, routing the generated responses to the selected device, and render the generated responses by processing environment 230 and/or the selected device(s) to present the rendered response(s) to users. Although the example illustrated in FIG. 2 divides the functions of the response module 250 among four modules 254 and 256, fewer or more modules may be employed to perform the operations of response module 250.

In the example illustrated in FIG. 2, response module 250 includes a response generation module 254 which is configured to generate a response to the query or command. The individual responses are generated much as expected for a virtual assistant. In some cases, response generation module 254 will operate in cooperation with action-taking module 246 to interact with an external resource (such as to collect a particular item of information available through an external service). In some cases, the response may be a request for additional information in response to processing environment 230 determining that additional information is needed to process the current utterance information.

In the example illustrated in FIG. 2, response module 250 includes a response rendering module 256 which is configured to render a response generated by response generation module 254. For example, a response may be encoded as a text string, which may be rendered as, for example, synthesized spoken audio in a first case, and as graphical text in a second case. In some examples, some or all of response rendering module 256 is implemented at a device used to present a response to user, and the rendering of the response is performed at the device. This may be effective for a user computing device with sufficient capability and resources to perform the rendering. In other embodiments, rendering of a response may be performed by the processing environment 230 and the rendered response provided to the device for presentation to the target user.

Knowledge access module 260 is configured to retrieve information from a virtual assistant information store 262, which may be used by, for example, interpretation module 236, action-taking module 246, and/or response module 250. In some cases, such modules may store information in virtual assistant information store 262 via knowledge access module 260. In some implementations, processing environment 230 may include a user information store 264 and knowledge access module 260 is further configured to retrieve user information from user information store 264, which may be used by, for example, by a requester recognition module, interpretation module 236, action-taking module 246, and/or response module 250. In some cases, such modules may store information in virtual assistant information store 262 via knowledge access module 260. In some cases, knowledge access module 260 may be further configured to retrieve external information from external information stores, the external information providing, for example, additional information associated with one or more of the users, a business or organization for one or more of the users, and/or domain specific information that may be improve handling of utterances by processing environment 230.

The system 200 and any of the other systems described herein can be implemented in conjunction with any of the hardware components described herein, such as the computing systems or mobile devices described below (e.g., comprising one or more processors, memory, and the like). In any of the examples herein, the inputs, outputs, preferences, rules, and states can be stored in one or more computer-readable storage media or computer-readable storage devices. The technologies described herein can be generic to the specifics of operating systems or hardware and can be applied in any variety of environments to take advantage of the described features. In any of the examples herein, a wake phrase can be used to 'wake' a listening device. Such a wake phrase can be in the form of a salutation, name of a virtual persona, or both. For example, "Hey <persona name>," "<persona name>," or the like can be used. Some examples use a wake phrase for a virtual persona (e.g., "Hey Cortana") for the sake of illustration, but the actual wake phrase can be changed without impacting the technologies as described herein.

In the embodiments that follow in FIGS. 3-10, the reader may understand that the various features, properties, characteristics, configurations, and/or arrangements as described above with reference to FIG. 2 may be equally applicable to the following embodiments. Thus, for example, although a device or system included therein may not be specifically described below as including a feature, property, characteristic, configuration and/or arrangement, it may be appreciated that the details provided above with respect to FIG. 2 may be incorporated in any of the following embodiments of FIGS. 3-10.

Figure 3:
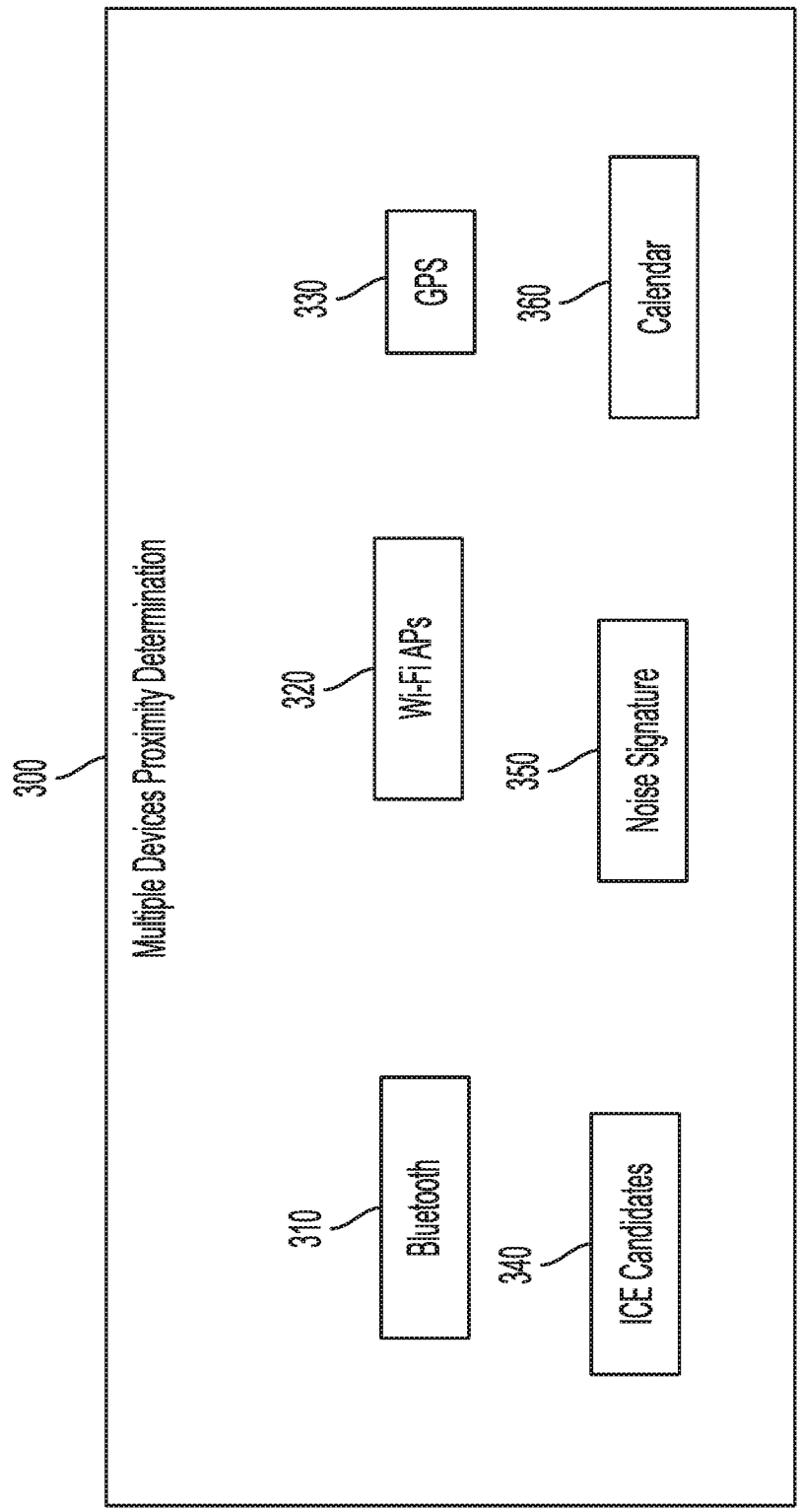
FIG. 3 illustrates a schematic example of factors that can be used in determining if two or more devices are proximate to one another.

Referring now to FIG. 3, a schematic diagram illustrates some examples of input features or signals 300 that may be used by the system to detect and identify a neighborhood of devices (i.e., devices that are proximate to one another). As shown in FIG. 3, in cases where there are multiple device endpoints which are configured with a 'listening' VA service, the system can make a determination regarding the relative proximity of two or more devices prior to the detection of a wake phrase. In one implementation, a heuristic or other learned model can be used to detect proximity of multiple device endpoints, based on some or all of Bluetooth data 310, Wi-Fi APs data 320, GPS data 330, ICE Candidates 340, Noise Signature data 350, and Calendar data 360. For example, the model may receive Bluetooth data 310 associated with a unique Bluetooth 'beacon' signatures that can be detected by some or all device endpoints that are nearby. The beacon observed by a neighboring device can be reported to a proximity service the processing environment. Similarly, in some implementations, some or all device endpoints can be configured to periodically scan for Wi-Fi access points, collecting the unique BSSIDs as Wi-Fi APs data 320 that can indicate the proximity of device endpoints to one another. In addition, some or all of the device endpoints can be configured to access GPS data 330 or other location signals that can be used to determine whether two or more devices are positioned near one another.

As another example, device endpoints can be configured to conduct connectivity checks to determine the most optimal paths for a voice call. In such cases, device endpoints that share the same network boundary as ICE Candidates 340 can be understood to represent a device neighborhood. In addition, the detected background noise signature from two or more device endpoints that is similar across the same time window (noise signature data 350) can indicate a shared receptivity environment. Furthermore, current meeting information (for example, device endpoints that are utilized for the same meeting at the same location) such as via Calendar data 360, may serve to define a device neighborhood.

Figure 4:
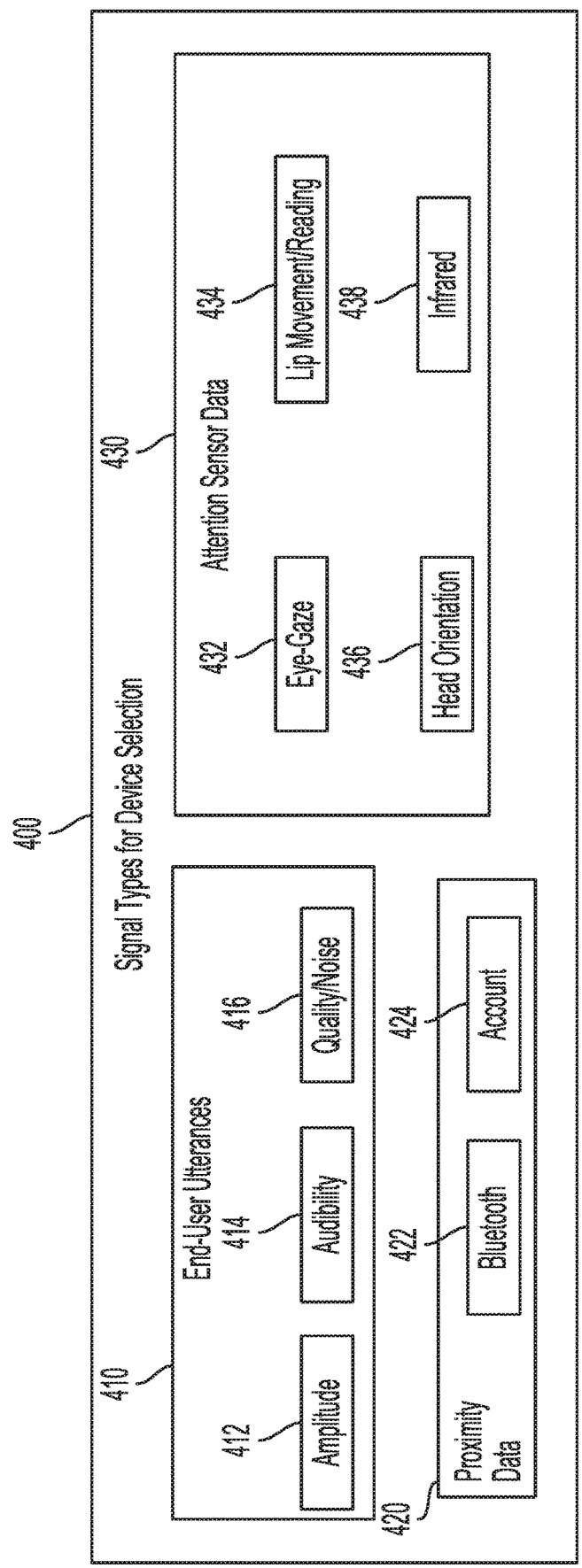
FIG. 4 illustrates a schematic example of signal types that may be collected in order to select a device for rendering a response to a spoken utterance directed to a virtual assistant.

FIG. 4 illustrates examples of types of signal data 400 that may be collected by the candidate devices in order to determine which device was most likely to represent the target device, including end-user utterances 410, proximity data 420, and attention sensor data 430. In the first example, characteristics of the audio signal provided by utterances 410, such as but not limited to amplitude (loudness) 412, audibility 414, and signal-to-noise ratio (SNR) 416. For example, if a first candidate device and a second candidate device both receive the same spoken utterance input, but the amplitude, audibility, and/or quality of the audio signal is greater for the first candidate device (with less noise), the system can determine that the first candidate device is more likely to represent the target device. In other words, the SNR and loudness of a user's speech is likely to be higher at the device endpoint they are close to and intended to interact with.

In addition, particularly in cases where there is a single user who interacts with multiple VA-enabled devices across different locations, the candidate device(s) can be configured to access the user's account to determine, for example with reference to a personal or work calendar, whether the user is scheduled to be present at particular location. For example, if the user has a first device at a first location (e.g., at work) that is near other candidate devices, and the first device is one of the multiple devices that receive the spoken utterance, the first device may be removed from consideration as the target device if the system determines that, based on the user's calendar or other account information, and/or presence signal such as a Bluetooth signal associated with a mobile device typically carried by the user, that the user is not present in the same space as the first device at the time the spoken utterance was received. Similarly, if the system determines that the user is scheduled to be near the first device at the time the spoken utterance is received, it becomes more likely that the first device is the target device.

Furthermore, attention data 430 as collected by various sensors of the candidate devices may provide a clearer indication as to which device was the intended target device. For example, eye-gaze data 432 may be collected by some or all of the candidate devices at or around the time at which the spoken utterance is received. It can be appreciated that, in some implementations, gaze-tracking or other signals corresponding to user behavior can occur following authorization from the person whose gaze or other behavior is to be tracked. In some implementations, camera data (such as, but not limited to, visual image data, infrared image data, and/or depth camera data) obtained to generate attention data 430 may also be used for user identification via methods such as, but not limited to, face recognition and/or skeletal recognition to determine that a particular user is physically present at a device. The authorization can vary widely across different scenarios, where a user may authorize eye tracking only when the VA has detected a wake phrase, or a universal authorization that applies at all times the VA is available. In addition, the authorization can be configured to be valid indefinitely, or for a specific duration (e.g., a few hours, a day, a week, a month, etc.), or until a sufficient and/or predetermined amount of eye data has been collected.

As a general matter, eye tracking techniques are used to identify and analyze patterns of visual attention of individuals as they perform specific tasks (e.g. reading, searching, scanning an image, driving, etc.). In many cases, the visual attention of a user can be determined from eye gaze data. At its most basic, attention is defined as the process by which we select a subset from all of the available information for further processing. With respect to the human eye, the narrow, high resolution foveal visual field is generally considered the "focus" of our attention, both visual and cognitive. Devices that track a person's gaze may include one or more cameras, illuminators, and can have access to various eye tracking algorithms. The illuminators are used to create a pattern of near-infrared light on a user's eyes, while the cameras can be used to take high-resolution images of the user's eyes and capture patterns of eye movement. Image processing algorithms find specific details in the user's eyes and reflections patterns. Based on these details, the eyes' position and gaze points can be calculated using available eye model algorithms.

Thus, if a user has consented to eye tracking, the eye tracker for a device may be automatically activated or engaged when a wake phrase is detected by the device. If there are two candidate devices and the user is directing their gaze toward a region associated with the first device when the wake phrase is uttered, and looking away from the second device, this can strongly signify an intention of the user to access the VA service for the first device.

Similarly, in some implementations, head position and/or head orientation 436 can be captured by one or more cameras associated with a device. If the head is oriented more toward the first device than to the second device, this can also be a strong indication that the user's intention was to access the VA service via the first device. The head orientation data is also temporally dependent, and must be collected at or around the same time that the utterance occurs. In some implementations, a user's head position and/or orientation can be tracked using one or more input devices, such as an image camera, one or more proximity sensors, one or more infrared cameras, one or more depth cameras, stereo cameras, or using information provided by any combination of two or more input devices. The cameras and sensors can be mounted in suitable locations in conjunction with the device, be mounted in various places in a room where the user is located, or be worn by the user. Based on the user's head position and/or orientation, a focus region can be identified by the system, corresponding to where the user's attention is focused.

In another implementation, infrared cameras can collect infrared data 438 regarding the proximity of a user to a particular device. As one example, in cases where a user is using two or more devices in a room that are spaced apart from one another, the devices can determine which device is nearest or most proximate to the speaker, and incorporate this information into its determination to increase the accuracy of device selection. In such cases, an optical proximity device may be positioned near or on the device so as to adequately detect the existence of a person or body part (such as a face). Suitable detectors include reflectance-based techniques such as reflectance or diffuse reflectance (e.g., far-infrared, near-infrared, infrared, or a combination thereof) or the like where reflected energy is detected. In some implementations, an optical proximity device includes a detector configured to analyze a range of wavelengths to determine the presence of a human or portion thereof.

In some other implementations, sensor data 430 can also include lip movement and/or lip-reading data. For example, in cases where there are multiple users in a single workspace, each with their own device endpoint, forming a large device neighborhood, the devices may capture image data of users as they speak. When multiple devices register detection of the wake phrase, each device can submit the corresponding video captured at the time of the spoken utterance to the processing environment. The system can then determine which image includes a speaking user, and/or whose lips are moving in a manner that corresponds to the sounds of the spoken utterance, which can be used to help select the correct device. For example, the system may include or otherwise access a lip-reading program configured to identify from image data the movements of one or more of lips and a tongue of a target face. Using the image data, the lip-reading program may identify movements of one or more of lips and a tongue of the target face and convert the movements into text.

In addition, in implementations where all potential device endpoints are 'signed in' or are managed by a unified service, other signals may also be collected to determine the most likely target device following the detection of a wake phrase. In one example, an audio watermark in the earcon (audio icon or signifier for the voice interaction) of the virtual assistant may be embedded in order to facilitate the ability of devices to discover or identify other nearby device endpoints that are also capable of servicing the user command. In some implementations, a first earcon of a first device can be used to suppress future earcon events for the same user command, as well to help make the device selection on the cloud service by relaying the captured watermark to the cloud along with the utterances. In another example, speech and visual ID of the same user can be leveraged to determine which device endpoint is the most likely target device.

Once a user is speaking to the virtual assistant, the system can be configured to collect additional signals to continue to detect the device endpoints in the vicinity of the spoken conversation. For example, the virtual assistant response management system can detect proximity during or after the user speech is received by the virtual assistant service, but before rendering a response to the spoken utterance. Specifically, the system can utilize spectral matching techniques for matching voice signals based on features that survive encoding or transcoding and are not dependent on the endpoint, including but not limited to Cepstral Coefficients (MFCC), Zero Crossing Rate, Power Spectral Density (PSD), Spectral Flatness Measure (SFM), and others. In some implementations, voice quality data and spectral matching techniques can be used for selection of the target device. In another example, the system can apply content-based matching for subsets of detected words in the utterances close in time to the utterance. In some cases, if a set of endpoints are likely to be together and are invoking the same skill with the same set of utterances, the system can be configured to continue to refine the selection process.

Furthermore, in different implementations, as a particular end-user continues to use the virtual assistant response management system, the system can learn a set of likely device endpoints in proximity to one another, in relation to other signals like time and location. In some cases, the system can also attempt to select the target device based at least in part on which device is best suited to render the device. For example, in a shared setting such as a conference room, the room device is likely to serve as a better response device for presentation to the all of the participants of the meeting. As another example, the system may seek to balance the user's privacy in a shared setting when rendering a response. If a user intends for his or her personal device endpoint to respond (rather than the shared room device), they can override the system device selection by using an alternate input mechanism, such as Push-To-Talk (PTT).

Figure 5:
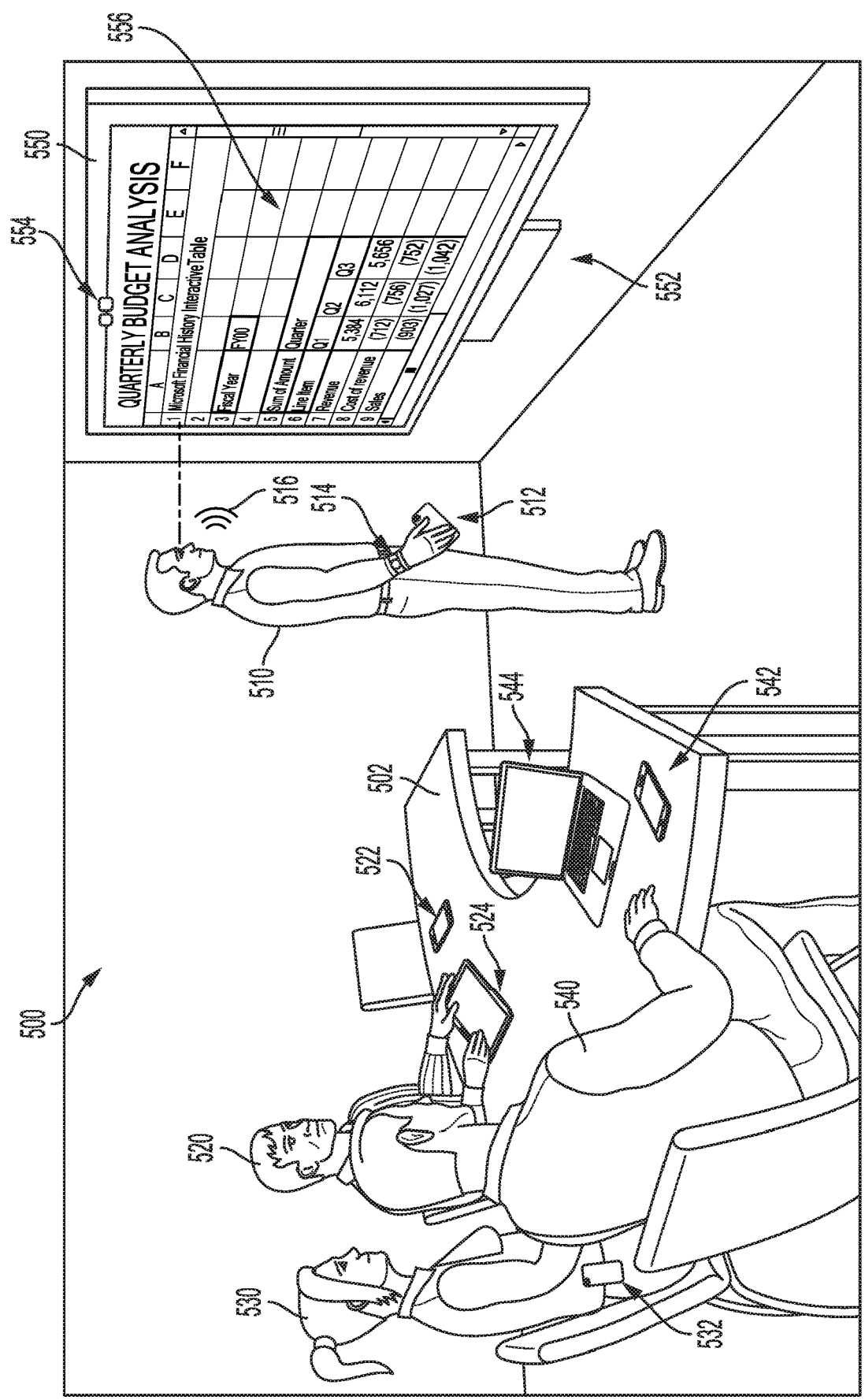
FIGS. 5-7 illustrate an example scenario in which multiple users are together in a single location in which they can speak and interact with a virtual assistant via a plurality of virtual assistant interface devices.
Figure 6:
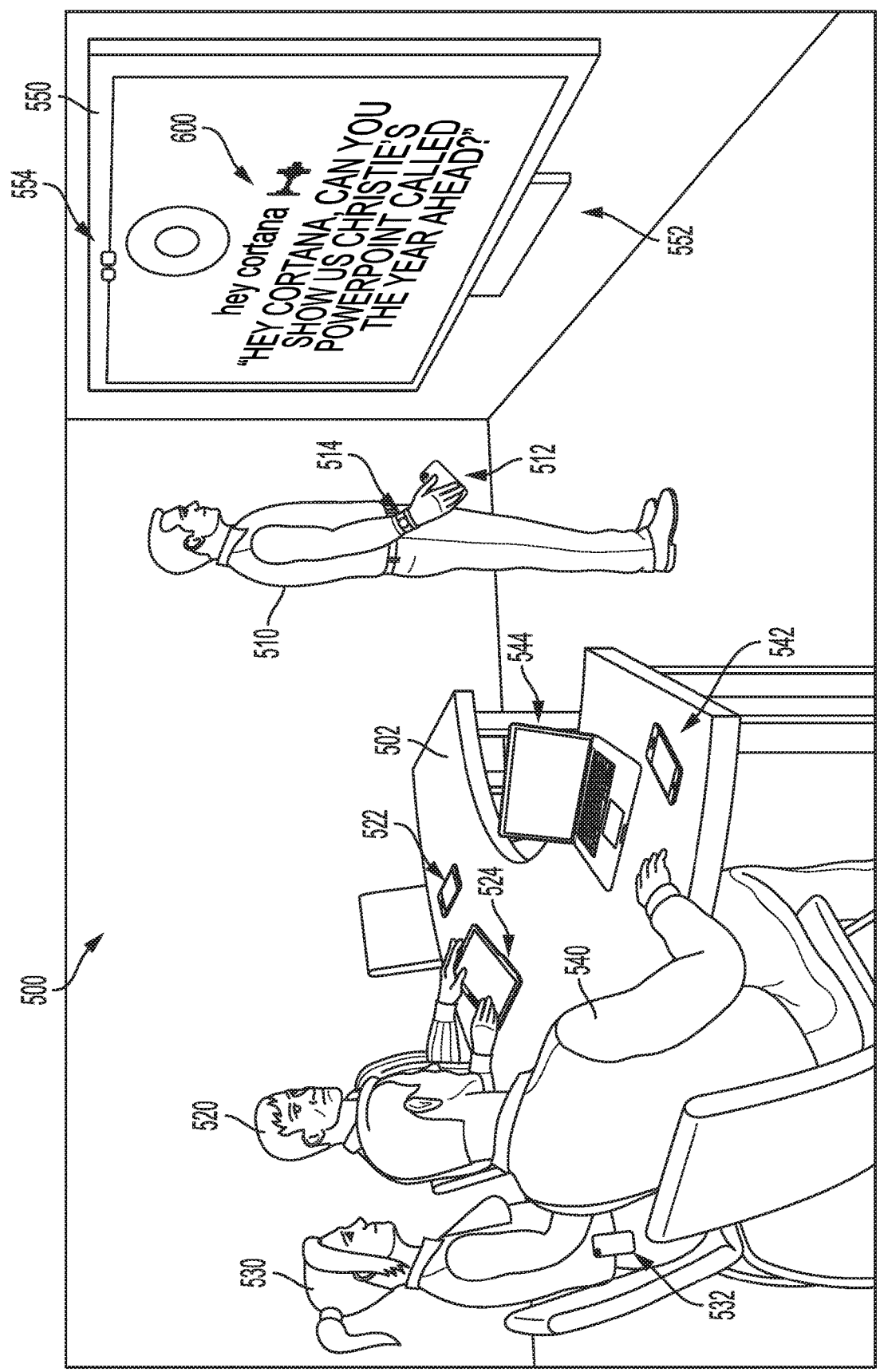
Figure 7:
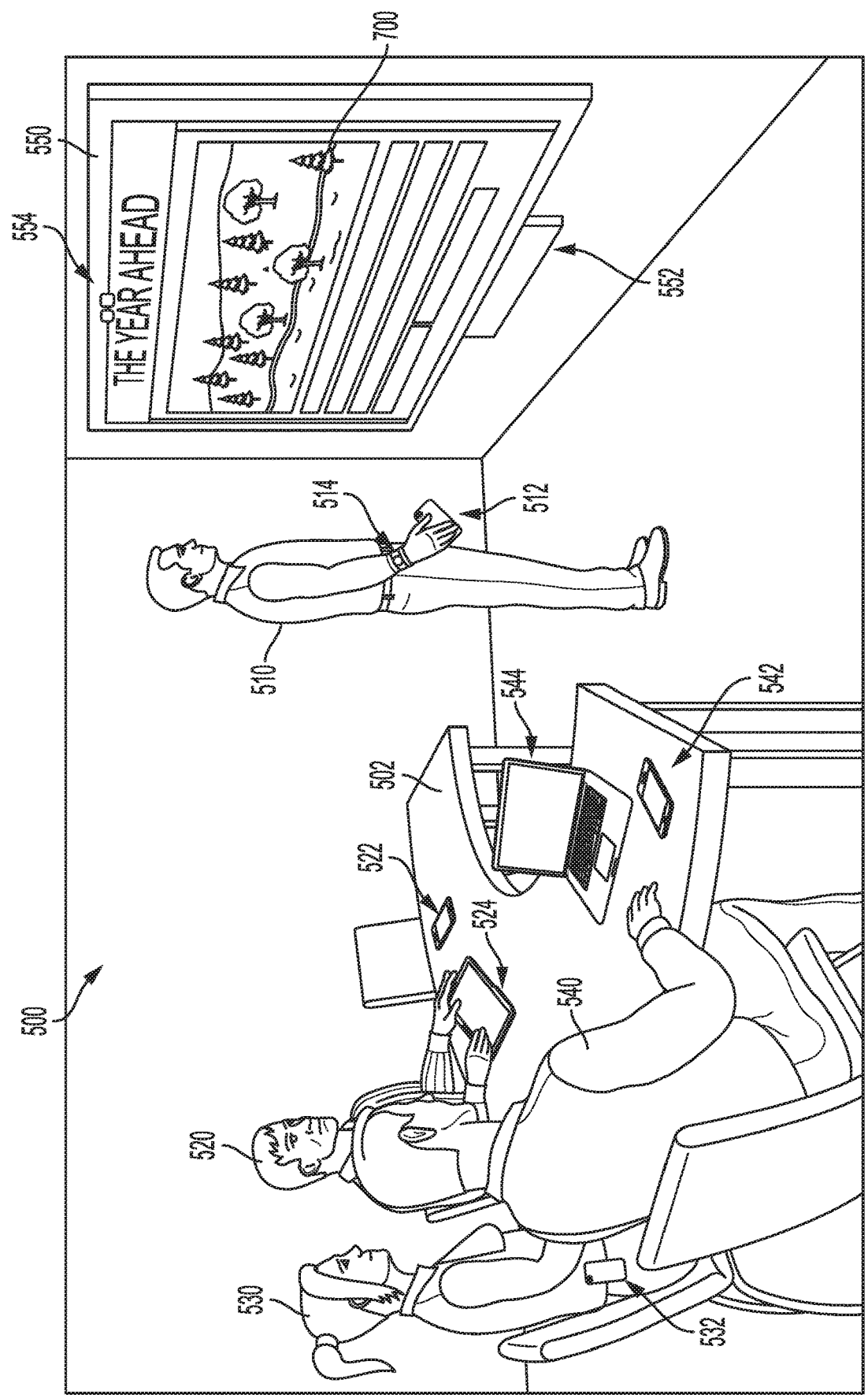

For purposes of clarity, an example scenario in which the proposed system may be implemented is presented with reference to FIGS. 5-7. In FIG. 5, a high-level example of a representative shared device environment ("environment") 500 for implementing a selective virtual assistant response management system ("system") is illustrated. In different implementations, the environment 500 can include one or more persons. In this example, a first user 510 stands adjacent to a large viewscreen 550 such as a computing device display, television, or projector screen, and a second user 520, a third user 530, and a fourth user 540 are seated at a conference table 502.

In FIG. 5, the first user 510 is viewing a spreadsheet 556 on the viewscreen 550. It should be understood that the viewscreen is a display for a VA-enabled computing device 552 located in the room. It can be understood that the computing device 552 is configured for connection to a network. In addition, first user 510 holds a first device 512 (here a mobile phone) and is wearing a second device 514 (a smartwatch) that are both equipped to offer the services of the VA. Similarly, second user 520 has brought a third device 522 (a mobile phone) and a fourth device 524 (a tablet) to the room, the third user 530 has brought a fifth device 532 (a mobile phone) worn on a holster, and the fourth user 540 has brought a sixth device 542 (a mobile phone) and a seventh device 544 (a laptop), where each of these devices is configured for connection to a network and access to the VA service.

As first user 510 engages with his devices and/or the other persons in the room, the first user 510 may turn the direction of their head or eye gaze and attend to various aspects being presented on the viewscreen 550. In FIG. 5, the first user 510 has directed their gaze toward the viewscreen 550 for computing device 552. As noted earlier, gaze that is directed toward a device may be used to identify an intent to invoke the services of the virtual assistant at that device. In other words, the system can be configured to interpret the gaze of a user as indicating an intent to elicit the VA service from the device that he or she is looking at. As one example, a user's gaze can move or change over time. While the user's gaze is directed away from the viewscreen, toward the first device 512 for example, spoken utterances may not trigger the services of the VA for computing device 552, but instead trigger services of the VA from the first device 512.

In FIG. 5, first user 510 looks directly at the viewscreen 550 and has decided to request the services of the VA by uttering a wake phrase 516. At and/or around the time he is speaking the wake phrase 516, the first user 510 is continuing to face toward the viewscreen, and cameras 554 determine his gaze is directed toward the viewscreen. In the small space provided by the conference room, it may be appreciated that all of devices 512, 514, 522, 524, 532, 542, 544, 550 have 'heard' the wake phrase 516. Because these devices have been identified as belonging to a single device neighborhood (see FIG. 3), the system can initiate a device selection process based on the various attention data that is being collected by each of the candidate devices. In this case, as shown in FIG. 6, the computing device 552 is selected as the target device in large part due to the detection of the first user's gaze or focus on the viewscreen 550, in contrast to the other devices, which were not being attended to at the time of the spoken utterance of the wake phrase 516.

In FIG. 6, the viewscreen 550 presents an indication 600 that the spoken utterance issued by the first user 510 has been received and is being processed by the computing device 552. As the first user 510 continues to engage with and issue spoken utterances to the VA, only the computing device 552 will present responses. Thus, when a request from the first user 510 to the VA for a new document to be opened is issued, as shown in FIG. 7, only the viewscreen 550 presents electronic content 700, while the remaining neighborhood devices remain dormant or inactive.

Figure 8:
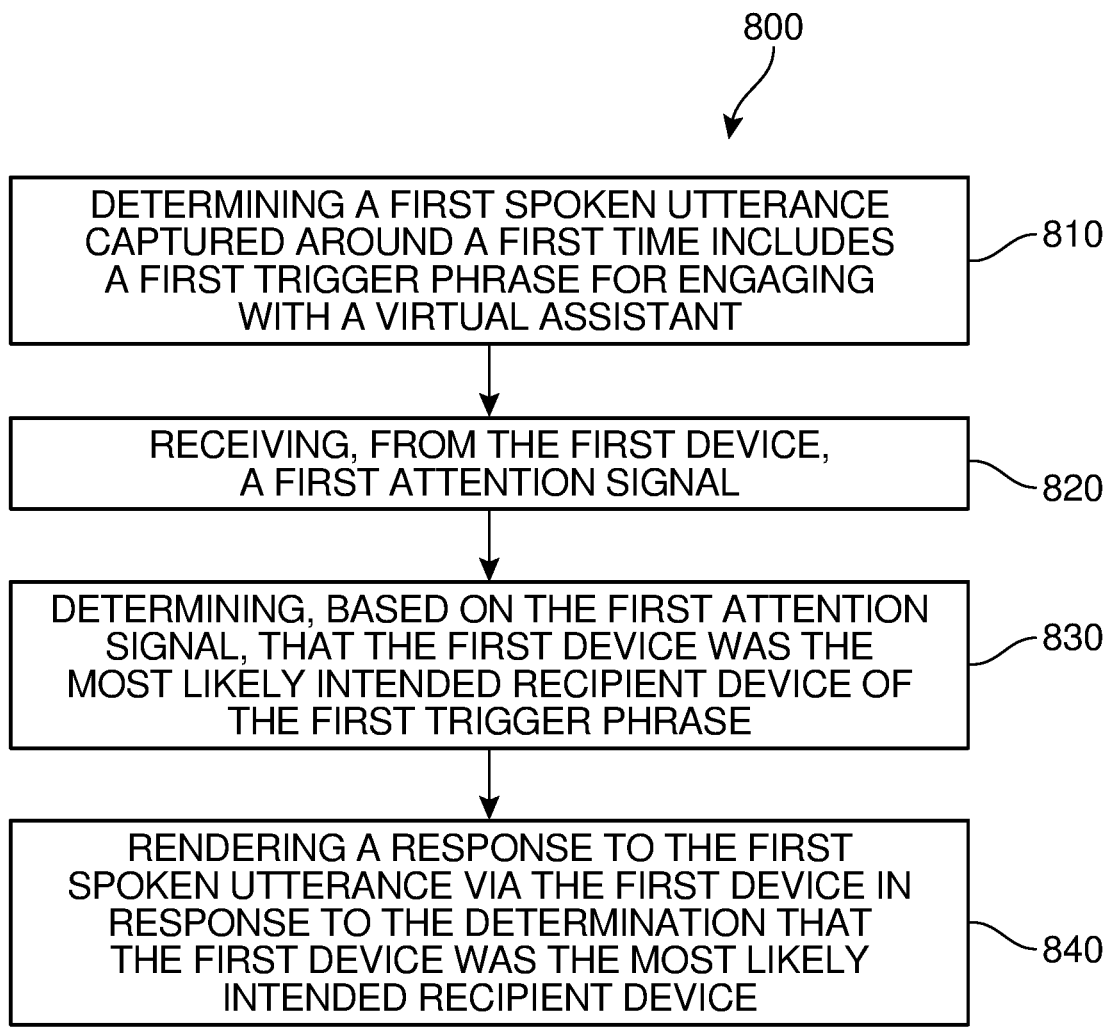
FIG. 8 is a flow chart illustrating a method of selecting a computing device to provide access to a virtual assistant.

Referring now to FIG. 8, a flow chart depicting a method 800 of selecting a computing device to provide access to a virtual assistant is provided. As shown in FIG. 8, the method includes a first step 810 of determining a first spoken utterance captured as a first audio signal by a first device around a first time includes a first trigger phrase for engaging with a virtual assistant, and a second step 820 of receiving, from the first device, a first attention signal captured by the first device around the first time. The method 800 also includes a third step 830 of determining, based on the first attention signal, that the first device was the most likely intended recipient device of the first trigger phrase, and a fourth step 840 rendering a response to the first spoken utterance via the first device in response to the determination that the first device was the most likely intended recipient device.

In different implementations, the method can include alternate or additional steps and aspects. For example, in some implementations, the first spoken utterance is also captured as a second audio signal by a second device that is in close proximity to the first device around the first time. In such cases, the method further includes receiving, from the second device, a second attention signal captured by the second device around the first time, determining, based on a comparison of the first attention signal and the second attention signal, that the second device is less likely to represent the intended recipient device than the first device, and preventing the second device from rendering a response to the first spoken utterance.

In another example, the first attention signal can include eye tracking data for a first user, and the eye tracking data indicates the first user was gazing at the first device around the first time. In some implementations, the first attention signal includes head orientation data for a first user, and the head orientation data indicates the first user was facing toward the first device around the first time. In another implementation, the first attention signal includes lip-reading data for a first user, and the lip-reading data indicates the first user articulated the spoken utterance at the first time. In one example, the first audio signal has a greater amplitude than the second audio signal, and in another example, the first audio signal has less noise than the second audio signal. In one implementation, the first device includes an optical proximity device.

In some implementations, the first device is associated with a first user account for a first user and the second device is associated with a second user account for a second user. In such cases, the method can also include accessing a first calendar of the first user account and a second calendar of the second user account, ascertaining, based on the first calendar and the second calendar, that the first user is scheduled to be near the first device at the first time and the second user is scheduled to be away from the second device at the first time, wherein determining that the second device is less likely to represent the intended recipient device than the first device is further based on ascertaining that the first user is scheduled to be near the first device and the second user is scheduled to be away from the second device.

In another implementation, the method further includes steps of determining a second spoken utterance, captured as a third audio signal by the first device around a second time and as a fourth audio signal by the second device around the second time, includes a second trigger phrase, receiving a third attention signal captured by the first device around the second time and a fourth attention signal captured by the second device around the second time, determining, based on the third attention signal and the fourth attention signal, that the second device was the most likely intended recipient device of the second trigger phrase, and rendering a response to the second spoken utterance via only the second device in response to the determination that the second device was the most likely intended recipient device of the second trigger phrase.

The detailed examples of systems, devices, and techniques described in connection with FIGS. 1-8 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 9:
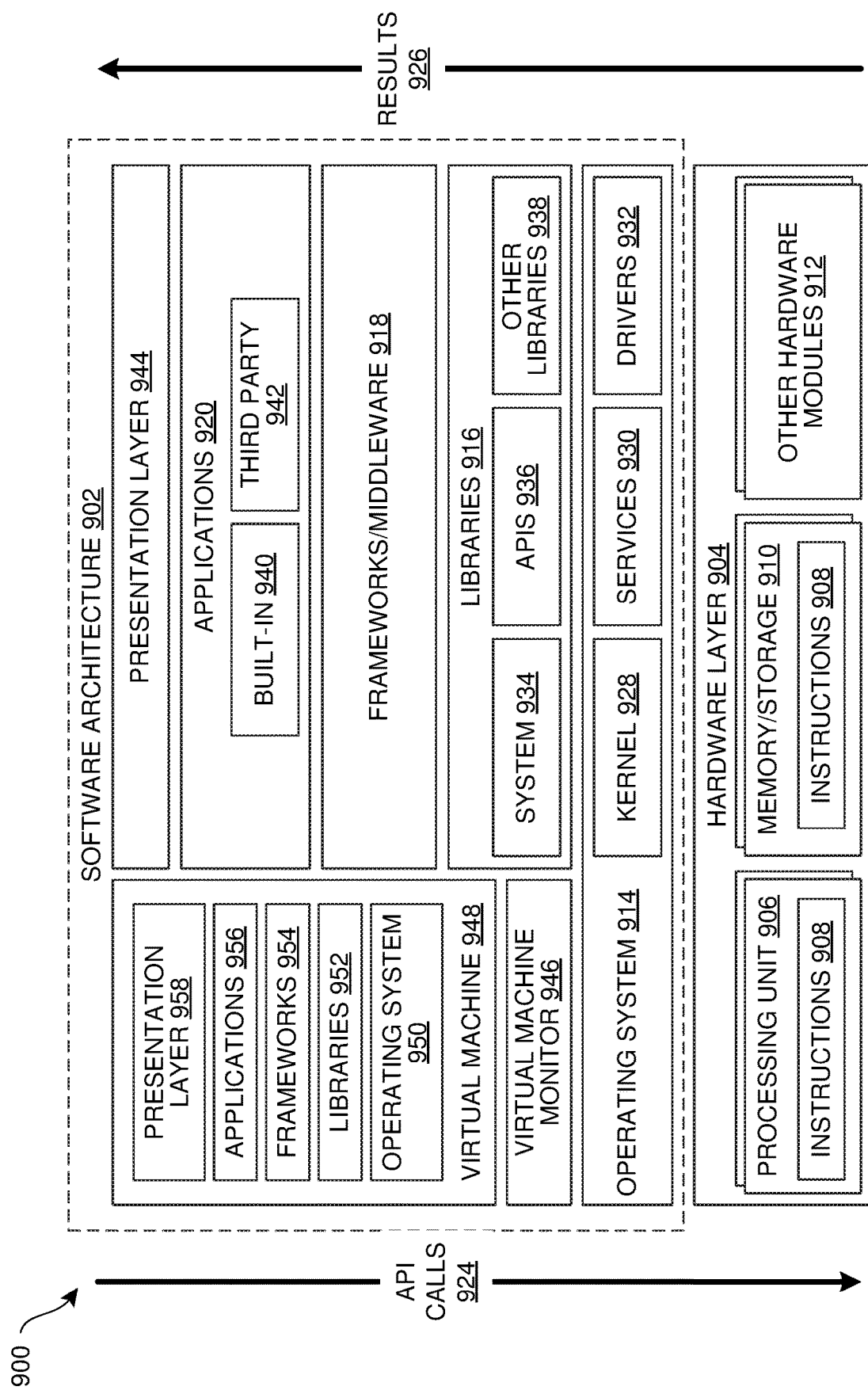
FIG. 9 is a block diagram illustrating an example software architecture, various portions of which may be used in conjunction with various hardware architectures herein described, which may implement any of the features herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware that includes, among other things, document storage 1070, processors, memory, and input/output (I/O) components. A representative hardware layer 904 is illustrated and can represent, for example, the device 90 of FIG. 1. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 950, libraries 952, frameworks 954, applications 956, and/or a presentation layer 958.

Figure 10:
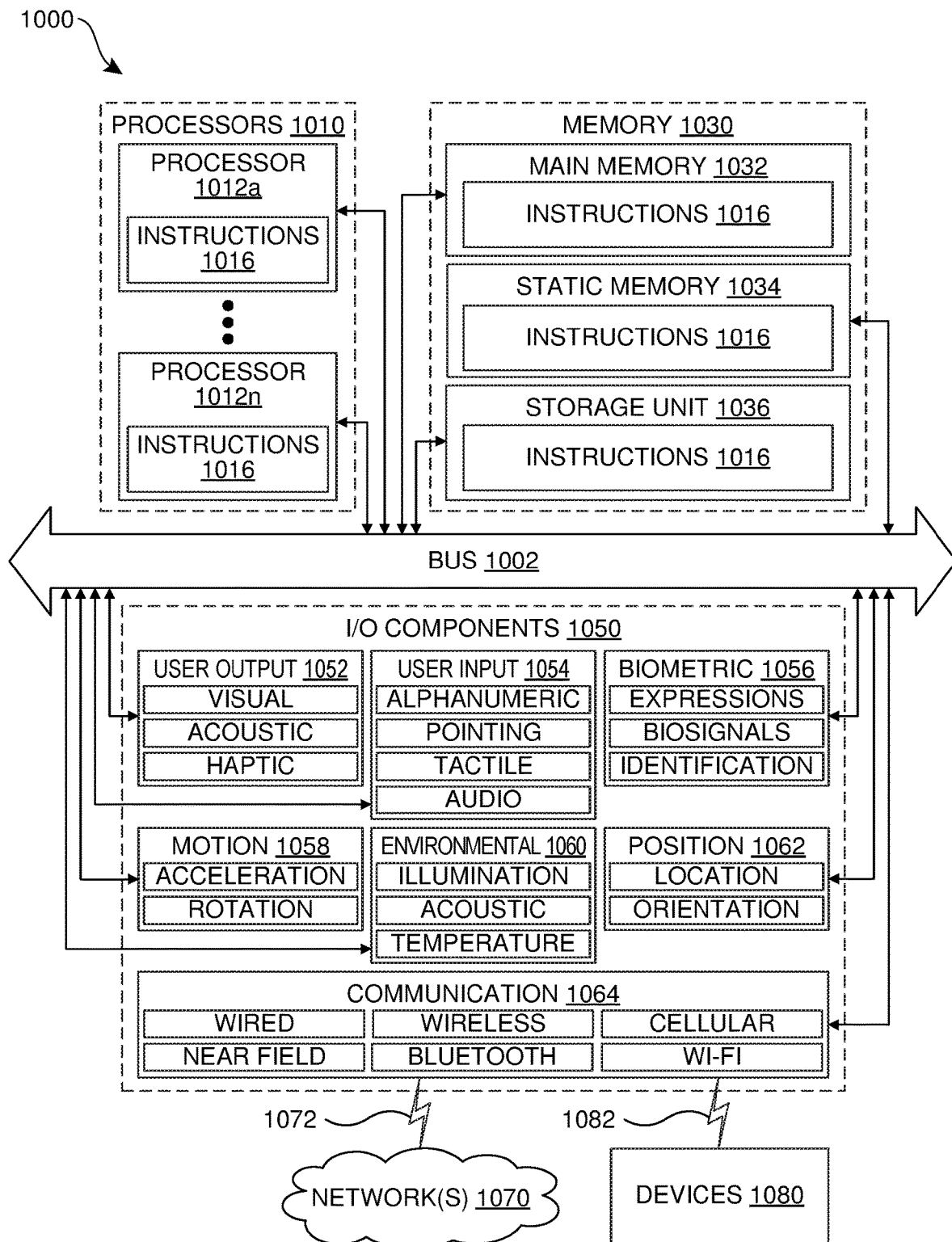
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment.

Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056 and/or position components 1062, among a wide array of other environmental sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network (s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for selecting one of a first device and a second device to respond to a voice command, wherein the second device is in proximity to the first device, the system comprising:
    one or more processors; and
    one or more machine-readable media including instructions stored therein which, when executed by the one or more processors, cause the system to:
        determine a first spoken utterance captured as a first audio signal by the first device around a first time including a first trigger phrase for engaging with a virtual assistant;
        determine the first spoken utterance captured as a second audio signal by the second device around the first time;
        receive, from the first device, a first attention signal captured by the first device around the first time;
        receive from the second device, a second attention signal captured by the second device around the first time;
        determine, based on a comparison of the first attention signal and the second attention signal, that the first device was the most likely intended recipient device of the first trigger phrase among the first device and the second device;
        render a response to the first spoken utterance via the first device in response to the determination that the first device was the most likely intended recipient device; and
        cause the second device to not render a response to the first spoken utterance in response to the determination that the first device was the most likely intended recipient device of the first trigger phrase.

2. The system of claim 1, wherein the first attention signal includes eye tracking data for a first user, and the eye tracking data indicates the first user was gazing at the first device around the first time.

3. The system of claim 1, wherein the first attention signal includes head orientation data for a first user, and the head orientation data indicates the first user was facing toward the first device around the first time.

4. The system of claim 1, wherein the first attention signal includes lip movement or lip-reading data for a first user, and the lip movement or lip-reading data indicates the first user articulated the spoken utterance at the first time.

5. The system of claim 1, wherein the first audio signal is determined to have a greater amplitude than the second audio signal.

6. The system of claim 1, wherein the first audio signal is determined to have less noise than the second audio signal.

7. The system of claim 1, wherein the first device is associated with a first user account for a first user and the second device is associated with a second user account for a second user, and the instructions further cause the system to:
  access a first calendar of the first user account and a second calendar of the second user account; and
  ascertain, based on the first calendar and the second calendar, that the first user is scheduled to be near the first device at the first time and the second user is scheduled to be away from the second device at the first time,
  wherein the determining that the second device is less likely to represent the intended recipient device than the first device is further based on ascertaining that the first user is scheduled to be near the first device and the second user is scheduled to be away from the second device.

8. The system of claim 1, wherein the instructions further cause the system to:
  determine a second spoken utterance, captured as a third audio signal by the first device around a second time and as a fourth audio signal by the second device around the second time, includes a second trigger phrase;
  receive a third attention signal captured by the first device around the second time and a fourth attention signal captured by the second device around the second time;
  determine, based on the third attention signal and the fourth attention signal, that the second device was the most likely intended recipient device of the second trigger phrase; and
  render a response to the second spoken utterance via only the second device in response to the determination that the second device was the most likely intended recipient device of the second trigger phrase.

9. The system of claim 1, wherein the first attention signal is obtained from an optical proximity device included in the first device.

10. A method of selecting one of a first device and a second device to respond to a voice command, wherein the second device is in proximity to the first device, to provide access to a virtual assistant, the method comprising:
  determining a first spoken utterance captured as a first audio signal by the first device around a first time including a first trigger phrase for engaging with the virtual assistant;
  determining the first spoken utterance captured as a second audio signal by the second device around the first time;
  receiving, from the first device, a first attention signal captured by the first device around the first time;
  receiving from the second device, a second attention signal captured by the second device around the first time;
  determining, based on a comparison of the first attention signal and the second attention signal, that the first device was the most likely intended recipient device of the first trigger phrase among the first device and the second device;
  rendering a response to the first spoken utterance via the first device in response to the determination that the first device was the most likely intended recipient device; and
  causing the second device to not render a response to the first spoken utterance in response to the determination that the first device was the most likely intended recipient device of the first trigger phrase.

11. The method of claim 10, wherein the first attention signal includes eye tracking data for a first user, and the eye tracking data indicates the first user was gazing at the first device around the first time.

12. The method of claim 10, wherein the first attention signal includes head orientation data for a first user, and the head orientation data indicates the first user was facing toward the first device around the first time.

13. The method of claim 10, wherein the first attention signal includes lip-reading data for a first user, and the lip-reading data indicates the first user articulated the spoken utterance at the first time.

14. The method of claim 10, wherein the first audio signal has a greater amplitude than the second audio signal.

15. The method of claim 10, wherein the first audio signal has less noise than the second audio signal.

16. The method of claim 10, wherein the first device is associated with a first user account for a first user and the second device is associated with a second user account for a second user, and the method further comprises:
  accessing a first calendar of the first user account and a second calendar of the second user account; and
  ascertaining, based on the first calendar and the second calendar, that the first user is scheduled to be near the first device at the first time and the second user is scheduled to be away from the second device at the first time,
  wherein the determining that the second device is less likely to represent the intended recipient device than the first device is further based on ascertaining that the first user is scheduled to be near the first device and the second user is scheduled to be away from the second device.

17. The method of claim 10, further comprising:
  determining a second spoken utterance, captured as a third audio signal by the first device around a second time and as a fourth audio signal by the second device around the second time, includes a second trigger phrase;
  receiving a third attention signal captured by the first device around the second time and a fourth attention signal captured by the second device around the second time;
  determining, based on the third attention signal and the fourth attention signal, that the second device was the most likely intended recipient device of the second trigger phrase; and
  rendering a response to the second spoken utterance via only the second device in response to the determination that the second device was the most likely intended recipient device of the second trigger phrase.

18. The method of claim 10, wherein the first device includes an optical proximity device.

19. The system of claim 1, wherein:

the first spoken utterance is made by a first user within listening ranges of both the first device and the second device;

the first attention signal is determined from attention data regarding head orientation of the first user obtained by a first camera on the first device;

the second attention signal is determined from attention data regarding head orientation of the first user obtained by a second camera on the second device, and the first and second devices are both virtual assistant-enabled devices and are both connected to a selective virtual assistant response management system configured to select which of the first and second devices will be selected to render the response to the first spoken utterance based on the first and second attention signals.

20. The system of claim 1, wherein:

the first spoken utterance is made by a first user within listening ranges of both the first device and the second device;

the first attention signal is determined from attention data regarding eye-gaze tracking of the first user obtained by a first camera on the first device;

the second attention signal is determined from attention data regarding eye-gaze tracking of the first user obtained by a second camera on the second device, and the first and second devices are both virtual assistant-enabled devices and are both connected to a selective virtual assistant response management system configured to select which of the first and second devices will be selected to render the response to the first spoken utterance based on the first and second attention signals.

21. The method of claim 10, wherein:

the first spoken utterance is made by a first user within listening ranges of both the first device and the second device;

the first attention signal is determined from attention data regarding head orientation of the first user obtained by a first camera on the first device;

the second attention signal is determined from attention data regarding head orientation of the first user obtained by a second camera on the second device, and the first and second devices are both virtual assistant-enabled devices and are both connected to a selective virtual assistant response management system configured to select which of the first and second devices will be selected to render the response to the first spoken utterance based on the first and second attention signals.

22. The method of claim 10, wherein:

the first spoken utterance is made by a first user within listening ranges of both the first device and the second device;

the first attention signal is determined from attention data regarding eye-gaze tracking of the first user obtained by a first camera on the first device;

the second attention signal is determined from attention data regarding eye-gaze tracking of the first user obtained by a second camera on the second device, and the first and second devices are both virtual assistant-enabled devices and are both connected to a selective virtual assistant response management system configured to select which of the first and second devices will be selected to render the response to the first spoken utterance based on the first and second attention signals.

* * * * *